United States Patent
Chen et al.

(10) Patent No.: US 11,508,236 B2
(45) Date of Patent: Nov. 22, 2022

(54) DEVICES AND METHODS FOR RECOGNIZING DRIVING BEHAVIOR BASED ON MOVEMENT DATA

(71) Applicant: BEIJING DIDI INFINITY TECHNOLOGY AND DEVELOPMENT CO., LTD., Beijing (CN)

(72) Inventors: Ao Chen, Beijing (CN); Zhongzhong Xiao, Beijing (CN); Chong Fan, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 31 days.

(21) Appl. No.: 16/699,211

(22) Filed: Nov. 29, 2019

(65) Prior Publication Data

US 2020/0105130 A1   Apr. 2, 2020

Related U.S. Application Data

(63) Continuation of application No. PCT/CN2017/086563, filed on May 31, 2017.

(51) Int. Cl.
  *G08G 1/01*  (2006.01)
  *G06N 20/00*  (2019.01)
  *G08G 1/052*  (2006.01)

(52) U.S. Cl.
  CPC .......... *G08G 1/0112* (2013.01); *G06N 20/00* (2019.01); *G08G 1/0133* (2013.01); *G08G 1/052* (2013.01)

(58) Field of Classification Search
  CPC .... G08G 1/0112; G08G 1/0133; G08G 1/052; G06N 20/00
  See application file for complete search history.

(56) References Cited

U.S. PATENT DOCUMENTS

| 7,839,292 | B2 | 11/2010 | Wang et al. |
| 10,460,534 | B1* | 10/2019 | Brandmaier ........... G07C 5/008 |
| 2010/0023263 | A1 | 1/2010 | Miyahara |
| 2012/0209634 | A1* | 8/2012 | Ling .................. G06Q 10/0833 |
| | | | 705/4 |

(Continued)

FOREIGN PATENT DOCUMENTS

| CN | 103337179 A | * | 10/2013 |
| CN | 103337179 A |   | 10/2013 |

(Continued)

OTHER PUBLICATIONS

International Search Report in PCT/CN2017/086563 dated Feb. 28, 2018, 4 pages.

(Continued)

*Primary Examiner* — Amine Benlagsir
(74) *Attorney, Agent, or Firm* — Metis IP LLC

(57) ABSTRACT

Electronic devices and methods for recognizing driving behavior are provided. The electronic devices may perform the methods to obtain first electronic signals encoding movement data associated with the electronic device from the at least one sensor at a target time point; operate logic circuits to determine whether the first electronic signals encoding movement data meets a precondition; and upon the first electronic signals encoding movement data meeting the precondition, send second electronic signals encoding movement data within a predetermined time period associated with the target time point to a remote server.

16 Claims, 10 Drawing Sheets

(56) References Cited

U.S. PATENT DOCUMENTS

| | | |
|---|---|---|
| 2013/0332024 A1 | 12/2013 | Garrett et al. |
| 2014/0095059 A1 | 4/2014 | Kandal |
| 2015/0254554 A1 | 9/2015 | Kato |
| 2016/0039426 A1 | 2/2016 | Ricci |
| 2016/0046298 A1* | 2/2016 | DeRuyck .............. B60W 50/14 340/576 |
| 2016/0133117 A1* | 5/2016 | Geller .................... A61B 5/746 340/457 |
| 2017/0032284 A1 | 2/2017 | Tsuchida |
| 2017/0092122 A1 | 3/2017 | Sharan |
| 2017/0150360 A1* | 5/2017 | Caldwell ............. H04W 12/082 |
| 2017/0255966 A1* | 9/2017 | Khoury ................... H04L 67/20 |
| 2018/0270241 A1* | 9/2018 | Herrmann ............. H04W 12/68 |
| 2018/0296165 A1 | 10/2018 | Leboeuf et al. |

FOREIGN PATENT DOCUMENTS

| | | | |
|---|---|---|---|
| CN | 103956007 A | | 7/2014 |
| CN | 104243713 A | * | 12/2014 |
| CN | 104243713 A | | 12/2014 |
| CN | 104463244 A | | 3/2015 |
| CN | 104802737 A | | 7/2015 |
| CN | 105989726 A | | 10/2016 |
| CN | 106203626 A | | 12/2016 |

OTHER PUBLICATIONS

Written Opinion in PCT/CN2017/086563 dated Feb. 28, 2018, 4 pages.
Extended European Search Report in European Application No. 17911759.3 dated May 3, 2020, 10 pages.
Notice of Reasons for Rejection in Japanese Application No. 2019-565885 dated Feb. 24, 2021, 9 pages.
Notice of Reasons for Rejection in Japanese Application No. 2019-565885 dated Nov. 30, 2021, 8 pages.
First Office Action in Chinese Application No. 201780091498.9 dated Jul. 6, 2021, 31 pages.

* cited by examiner

600

DEVICES AND METHODS FOR RECOGNIZING DRIVING BEHAVIOR BASED ON MOVEMENT DATA

CROSS-REFERENCE TO RELATED APPLICATIONS

This application is a continuation application of International Application No. PCT/CN2017/086563, filed on May 31, 2017, the entire contents of which are incorporated herein by reference.

TECHNICAL FIELD

The present disclosure generally relates to devices and methods for recognizing behavior, and in particular, devices and methods for recognizing driving behavior based on movement data.

BACKGROUND

With the development of Internet technology, on-demand services, such as online taxi hailing services and delivery services, have played a significant role in people's daily life. For example, on-demand transportation service for a transportation may be heavily be used by a user (e.g., a passenger). Through an online on-demand service platform, the user may request an on-demand service in the form of an on-demand service through an application installed in a user equipment, such as a mobile smart phone. Using data generated by the mobile smart phone, the online on-demand service platform may analyze driving behavior for the transportation service.

SUMMARY

According to an aspect of the present disclosure, an electronic device is provided. The electronic device may include at least one sensor; at least one processor-readable storage medium including a set of instructions for detecting predefined driving behaviors; and at least one processor in communication with the at least one processor-readable storage medium. When executing the set of instructions, the at least one processor may be directed to perform one or more of the following operations. The at least one processor may obtain first electronic signals encoding movement data associated with the device from the at least one sensor at a target time point. The at least one processor may operate logic circuits to determine whether the first electronic signals encoding movement data meets a precondition. Upon the first electronic signals encoding movement data meeting the precondition, the at least one processor may send second electronic signals encoding movement data within a predetermined time period associated with the target time point to a remote server.

According to another aspect of the present disclosure, a method detecting predefined driving behaviors is provided. The method may include obtaining, by an electronic device, first electronic signals encoding movement data associated with the electronic device at a target time point; determining, by the electronic device, whether the first electronic signals encoding movement data meets a precondition; and upon the first electronic signals encoding movement data meeting the precondition, sending, by the at least one processor, second electronic signals encoding movement data within a predetermined time period associated with the target time point to a remote server.

In some embodiments, the electronic device may be a mobile smart phone including a touch screen, a speaker, a microphone, or an antenna, and the mobile smart phone connects to a mobile network and can make phone calls.

In some embodiments, the at least one sensor may include at least one of a gyroscope, an acceleration sensor, a global position system (GPS), or a gravity sensor.

In some embodiments, the at least one processor may further determine the electronic device is moving with a vehicle.

In some embodiments, the first electronic signals encoding movement data may include at least one of linear acceleration, angular acceleration, or gesture information, the gesture information including role information, yaw information, or pitch information.

In some embodiments, the at least one sensor may periodically generate the first electronic signals encoding movement data, and the electronic device may periodically obtain the first electronic signals encoding movement data.

In some embodiments, the at least one processor may further operate logic circuits in the at least one processor to filter out unwanted information from the first electrical signals encoding movement data based on a machine learning trained model.

In some embodiments, the unwanted information may be noise information associated with at least one of shaking the device, dropping the device onto a bottom of the vehicle, or an electronic malfunction of the device.

In some embodiments, the precondition may include at least one of a threshold of the linear acceleration, a threshold of the lasting time of the linear acceleration, a threshold of the angular acceleration, a threshold of the lasting time of the angular acceleration, a number of changes of an acceleration direction during a predetermined length of time, or a number of changes of a gesture with a time length.

In some embodiments, the at least one processor may further send the second electronic signals encoding movement data within the predetermined time period associated with the target time point by a varying transmitting frequency.

In some embodiments, the at least one processor may further determine a trigger time point once the first electronic signals encoding movement data meets the precondition and select the second electronic signals encoding movement data in the predetermined time period based on the trigger time point.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
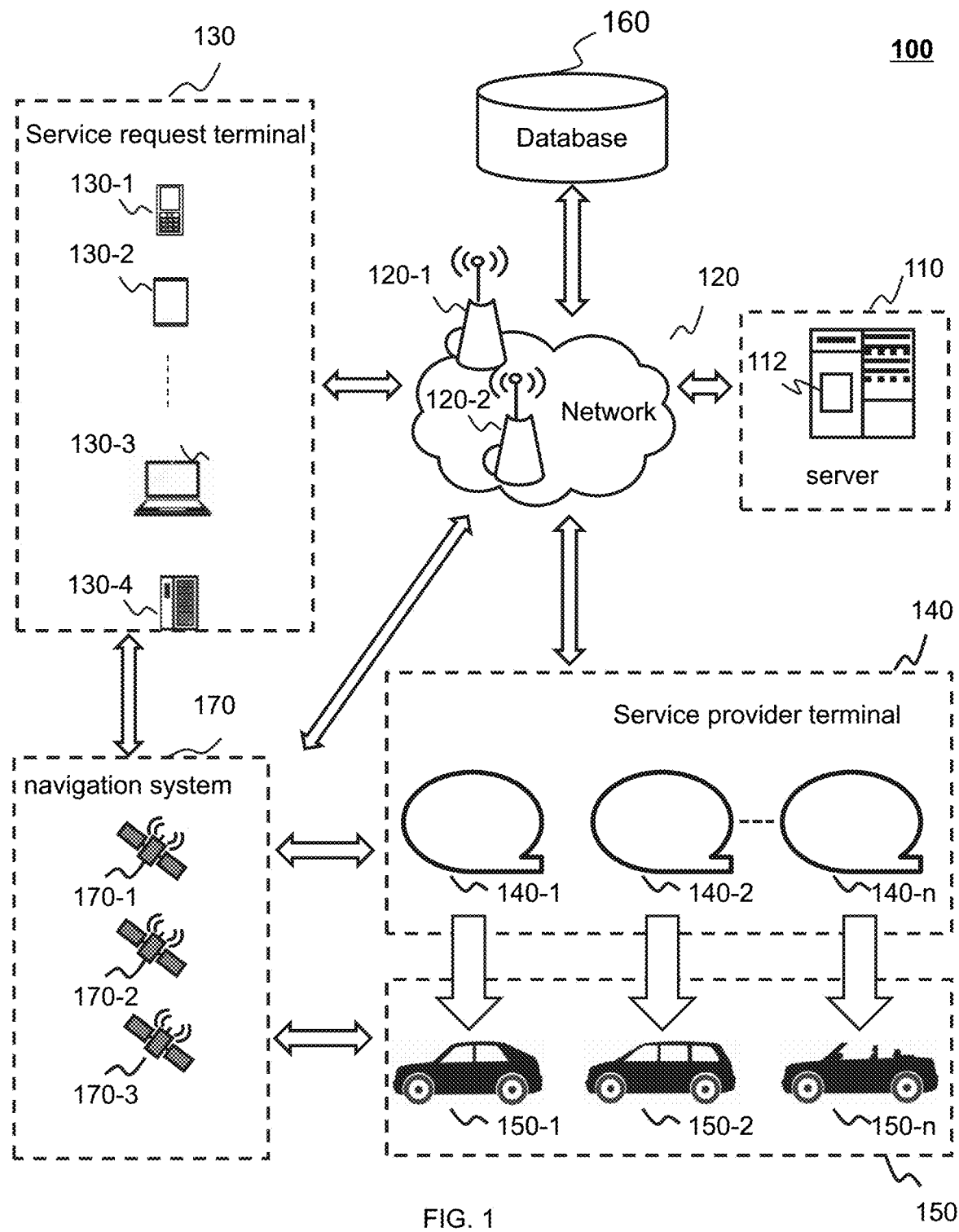
FIG. 1 is a block diagram illustrating an exemplary on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the processes of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to distributing a request for a transportation service, it should also be understood that the present disclosure is not intended to be limiting. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may be implemented on a user device and include a webpage, a plug-in of a browser, a client terminal, a custom system, an internal analysis system, an artificial intelligence robot, or the like, or any combination thereof.

The term "passenger," "requestor," "service requestor," and "customer" in the present disclosure are used interchangeably to refer to an individual, an entity, or a tool that may request or order a service. Also, the term "driver," "provider," and "service provider" in the present disclosure are used interchangeably to refer to an individual, an entity, or a tool that may provide a service or facilitate the providing of the service.

The term "service request," "request for a service," "requests," and "order" in the present disclosure are used interchangeably to refer to a request that may be initiated by a passenger, a service requestor, a customer, a driver, a provider, a service provider, or the like, or any combination thereof. The service request may be accepted by any one of a passenger, a service requestor, a customer, a driver, a provider, or a service provider. The service request may be chargeable or free.

The term "service provider terminal" and "driver terminal" in the present disclosure are used interchangeably to refer to a mobile terminal that is used by a service provider to provide a service or facilitate the providing of the service. The term "service requestor terminal" and "passenger terminal" in the present disclosure are used interchangeably to refer to a mobile terminal that is used by a service requestor to request or order a service.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to online devices and methods for recognizing a driving behavior, based on movement data. The devices and methods collect the movement data generated by sensors in a mobile smart phone and/or a vehicle data recorder. The sensor may include a gyroscope, an acceleration sensor, a global position system (GPS), a gravity sensor, a light sensor, a temperature sensor, a fingerprint sensor, a heart rate sensor, a proximity sensor, an image sensor, or a voice sensor. After the movement data generated by the sensor, the mobile smart phone and/or the vehicle data recorder may select the movement data based on a precondition. For example, if the precondition is met, the mobile smart phone may select and send the movement data may to a remote receiver, such as a server. The server may analyze the movement data using a machine learning trained model and determine a corresponding driving behavior. As another example, if the precondition is met, the vehicle data recorder may send an alter data to a remote server. The server may respond to the vehicle data recorder with an instruction including, e.g., recording a video within a time interval, calling a police, etc. The driving behavior may be used to rank the driver or used by a traffic management department.

According to example embodiments of the present disclosure, an automobile data recorder (with a plurality of sensors) may collect movement data thereof or movement data of a vehicle that the automobile data recorder is attached to. The movement data may be associated with a driver behavior or a passenger behavior, including but not limited to voice-related behavior, facial expression, motion behavior, dressing-up behavior, ceremonial Behavior, etc. The automobile data recorder may determine whether the collected movement data (automatically) meet a precondition. The precondition may be corresponding to the driver behavior or the passenger behavior. The precondition may include rule and definition, the rule including steps how to determine the collected movement data meet the precondition. The definition may include frequency of keyword (e.g., help, blood, sex, drug, wine, etc.) involved in voice, facial expression, control instruments, language meaning, etc.). The rule and definition may be local or stored in an MIS.

The automobile data recorder may send alert data to a remote server (or terminal of the MIS). The alert data may be the same as the collected movement data or may include a description of the driver behavior (as a fixed form), a level of the danger (1, 2, or 3; common, civil, or criminal), a type of the driver behavior (fighting, harassment, sleep), a consequence, whether the driver needs a behavioral intervention, and/or whether someone monitoring the driver (e.g., the server 110) needs to call a police to assist or regulate the driver, etc.

The remote server may determine whether to trigger the automobile data recorder to generated a video, how to generate the video, who is main object in the video, whether to store the video, whether to submit the video, etc. Then the remote server may send an instruction associated with the determination to the automobile data recorder. (In some embodiments, the automobile recorder may directly determine whether to generate a video.) The automobile data recorder may then generate a video, based on an instruction from the remote server. The video may be compressed, and then sent to the remote server.

The remote server may analyze the movement data or the video, and then determine the driver behavior, or the passenger behavior, a road-related condition, a vehicle-related condition, etc. The vehicle-related condition may be used to generate a plurality of suggestions to the driver. The drive behavior or passenger behavior may be used to generate a driver behavior mode or a passenger behavior mode.

It should be noted that the online on-demand transportation service, such as online taxi hailing, is a newly emerged service rooted in post-Internet era. It provides the technical solutions to the passengers and drivers that could raise in post-Internet era. In the pre-Internet era, when a passenger hails a taxi, the passenger may have no knowledge of an estimated time of arrival to a destination or location. If the passenger hails a taxi through a telephone call, it may be difficult for the service provider (e.g., a driver, a taxi company, a post office, a delivery company, or an agent, etc.) to estimate a time arriving the destination for the passenger. Online on-demand transportation system, however, may determine movement data associated with the driving behavior such as an aggressive acceleration, an aggressive braking, or an aggressive turn. When the precondition is satisfied, the online on-demand transportation system may select the movement data in a time interval. The selected movement data may be sent to a remote sever, where the selected movement data may be filtered (e.g., filter out unwanted information). The filtered movement data may further be used to generate feature data. The machine learning trained model may determine driving behavior based on the feature data. The driving behavior may be used to monitor the driver in the route. Therefore, through Internet, the online on-demand transportation systems may provide a much more convenient and efficient transaction platform for the passengers and the drivers that may never be met in a traditional pre-Internet transportation service system.

FIG. 1 is a block diagram illustrating an exemplary on-demand service system 100 according to some embodiments. For example, the on-demand service system 100 may be an online transportation service platform for transportation services. The on-demand service system 100 may include a server 110, a network 120, a service requestor terminal 130, a service provider terminal 140, a vehicle 150, a database 160, and a navigation system 170.

The on-demand service system 100 may provide a plurality of services. Exemplary service may include a taxi hailing service, a chauffeur service, an express car service, a carpool service, a bus service, a driver hire service, a shuttle service, or the like, or any combination thereof. In some embodiments, the on-demand service may be any on-line service, such as booking a meal, shopping, or the like, or any combination thereof. In some embodiments, the on-demand service system 100 may be a management information system (MIS). The MIS may include at least one server (e.g., the server 110), at least one terminal (e.g., the vehicle 150, service requestor terminal 130, the service provider terminal 140, etc.), at least one sensor or device (e.g., a vehicle data recorder, a mobile smart phone, an on-board diagnostics (OBD), an advanced driver assistant system (ADAS), a laser radar, etc.), or the like, or any combination thereof.

In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the service requestor terminal 130, the service provider terminal 140, and/or the database 160 via the network 120. As another example, the server 110 may be directly connected to the service requestor terminal 130, the service provider terminal 140, and/or the database 160 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 800 having one or more components illustrated in FIG. 8 in the present disclosure.

In some embodiments, the server 110 may include a processing engine 112. The processing engine 112 may process information and/or data related to the service request to perform one or more functions described in the present disclosure. For example, the processing engine 112 may determine one or more candidate service provider terminals in response to the service request received from the service requestor terminal 130. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the on-demand service system 100 (e.g., the server 110, the service requestor terminal 130, the service provider terminal 140, the vehicle 150, the database 160, and the navigation system 170) may send information and/or data to other component(s) in the on-demand service system 100 via the network 120. For example, the server 110 may receive a service request from the service requestor terminal 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a passenger may be an owner of the service requestor terminal 130. In some embodiments, the owner of the service requestor terminal 130 may be someone other than the passenger. For example, an owner A of the service requestor terminal 130 may use the service requestor terminal 130 to send a service request for a passenger B, or receive a service confirmation and/or information or instructions from the server 110. In some embodiments, a service provider may be a user of the service provider terminal 140. In some embodiments, the user of the service provider terminal 140 may be someone other than the service provider. For example, a user C of the service provider terminal 140 may use the service provider terminal 140 to receive a service request for a service provider D, and/or information or instructions from the server 110. In some embodiments, "passenger" and "passenger terminal" may be used interchangeably, and "service provider" and "service provider terminal" may be used interchangeably. In some embodiments, the service provider terminal may be associated with one or more service providers (e.g., a night-shift service provider, or a day-shift service provider).

In some embodiments, the service requestor terminal 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a HoloLens, a Gear VR, etc. In some embodiments, built-in device in the vehicle 130-4 may include an onboard computer, an onboard television, etc. In some embodiments, the service requestor terminal 130 may be a device with positioning technology for locating the position of the passenger and/or the service requestor terminal 130.

The service provider terminal 140 may include a plurality of service provider terminals 140-1, 140-2, . . . , 140-n. In some embodiments, the service provider terminal 140 may be similar to, or the same device as the service requestor terminal 130. In some embodiments, the service provider terminal 140 may be customized to be able to implement the online on-demand transportation service. In some embodiments, the service provider terminal 140 may be a device with positioning technology for locating the service provider, the service provider terminal 140, and/or a vehicle 150 associated with the service provider terminal 140. In some embodiments, the service requestor terminal 130 and/or the service provider terminal 140 may communicate with other positioning device to determine the position of the passenger, the service requestor terminal 130, the service provider, and/or the service provider terminal 140. In some embodiments, the service requestor terminal 130 and/or the service provider terminal 140 may periodically send the positioning information to the server 110. In some embodiments, the service provider terminal 140 may also periodically send the availability status to the server 110. The availability status may indicate whether a vehicle 150 associated with the service provider terminal 140 is available to carry a passenger. For example, the service requestor terminal 130 and/or the service provider terminal 140 may send the positioning information and the availability status to the server 110 every thirty minutes. As another example, the service requestor terminal 130 and/or the service provider terminal 140 may send the positioning information and the availability status to the server 110 each time the user logs into the mobile application associated with the online on-demand transportation service.

In some embodiments, the service provider terminal 140 may correspond to one or more vehicles 150. The vehicles 150 may carry the passenger and travel to the destination. The vehicles 150 may include a plurality of vehicles 150-1, 150-2, . . . , 150-n. One vehicle may correspond to one type of services (e.g., a taxi hailing service, a chauffeur service, an express car service, a carpool service, a bus service, a driver hire service, and a shuttle service). In some embodiments, the vehicle 150 may be related to several device including, for example, a vehicle data recorder, a mobile smart phone, an on-board diagnostics (OBD), an advanced driver assistant system (ADAS), to store, process, analyze and/or transmit movement data generated by the vehicles 150.

The database 160 may store data and/or instructions. In some embodiments, the database 160 may store data obtained from the service requestor terminal 130 and/or the service provider terminal 140. In some embodiments, the database 160 may store data and/or instructions that the server 110 may execute or use to perform exemplary processes described in the present disclosure. In some embodiments, database 160 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 160 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 160 may be connected to the network 120 to communicate with one or more components in the on-demand service system 100 (e.g., the server 110, the service requestor terminal 130, the service provider terminal 140, etc.). One or more components in the on-demand service system 100 may access the data or instructions stored in the database 160 via the network 120. In some embodiments, the database 160 may be directly connected to or communicate with one or more components in the on-demand service system 100 (e.g., the server 110, the service requestor terminal 130, the service provider terminal 140, etc.). In some embodiments, the database 160 may be part of the server 110.

The navigation system 170 may determine information associated with an object, for example, one or more of the service requestor terminal 130, the service provider terminal 140, the vehicle 150, etc. In some embodiments, the navigation system 170 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, or a current time. The navigation system 170 may include one or more satellites, for example, a satellite 170-1, a satellite 170-2, and a satellite 170-3. The satellites 170-1 through 170-3 may determine the information mentioned above independently or jointly. The satellite navigation system 170 may send the information mentioned above to the network 120, the service requestor terminal 130, the service provider terminal 140, or the vehicle 150 via wireless connections.

In some embodiments, one or more components in the on-demand service system 100 (e.g., the server 110, the service requestor terminal 130, the service provider terminal 140, etc.) may have permissions to access the database 160. In some embodiments, one or more components in the on-demand service system 100 may read and/or modify information related to the passenger, service provider, and/or the public when one or more conditions are met. For example, the server 110 may read and/or modify one or more passengers' information after a service is completed. As another example, the server 110 may read and/or modify one or more service providers' information after a service is completed.

In some embodiments, information exchanging of one or more components in the on-demand service system 100 may be initiated by way of requesting a service. The object of the service request may be any product. In some embodiments, the product may include food, medicine, commodity, chemical product, electrical appliance, clothing, car, housing, luxury, or the like, or any combination thereof. In some other embodiments, the product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile smart phone, a personal digital assistance (PDA), a smart watch, a point of sale (POS) device, an onboard computer, an onboard television, a wearable device, or the like, or any combination thereof. For example, the product may be any software and/or application used in the computer or mobile smart phone. The software and/or application may relate to socializing, shopping, transporting, entertainment, learning, investment, or the like, or any combination thereof. In some embodiments, the software and/or application related to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

One of ordinary skill in the art would understand that when an element (e.g., a server, a terminal etc.) of the on-demand service system 100 performs, the element may perform through electronic signals and/or electromagnetic signals. For example, when a service requestor terminal 130 processes a task, such as making a determination, identifying or selecting an object, the requestor terminal 130 may operate logic circuits or processing circuites in its processor to process such task. When the service requostor terminal 130 sends out a service request to the server 110, a processor of the service requestor terminal 130 may generate electronic signals encoding the request. The processor of the service requestor terminal 130 may then send the electronic signals to an output port. If the service requestor terminal 130 communicates with the server 110 via a wired network, the output port may be physically connected to a cable, which further transmit the electronic signals to an input port of the server 110. If the service requestor terminal 130 communicates with the server 110 via a wireless network, the output port of the service requestor terminal 130 may be one or more antennas, which convert the electronic signals to electromagnetic signals. Similarly, a service provider terminal 130 may process a task through operation of logic circuits or processing circuits in its processor, and receive an instruction and/or service request from the server 110 via electronic signals or electromagnet signals. Within an electronic device, such as the service requestor terminal 130, the service provider terminal 140, and/or the server 110, when a processor thereof processes an instruction, sends out an instruction, and/or performs an action, the instruction and/or action is conducted via electronic signals. For example, when the processor retrieves or saves data from a storage medium, it may send out electronic signals to a read/write device of the storage medium, which may read or write structured data in the storage medium. The structured data may be transmitted to the processor in the form of electronic signals via a bus of the electronic device. Here, an electronic signal may refer to one electronic signal, a series of electronic signals, and/or a plurality of discrete electronic signals.

Figure 2:
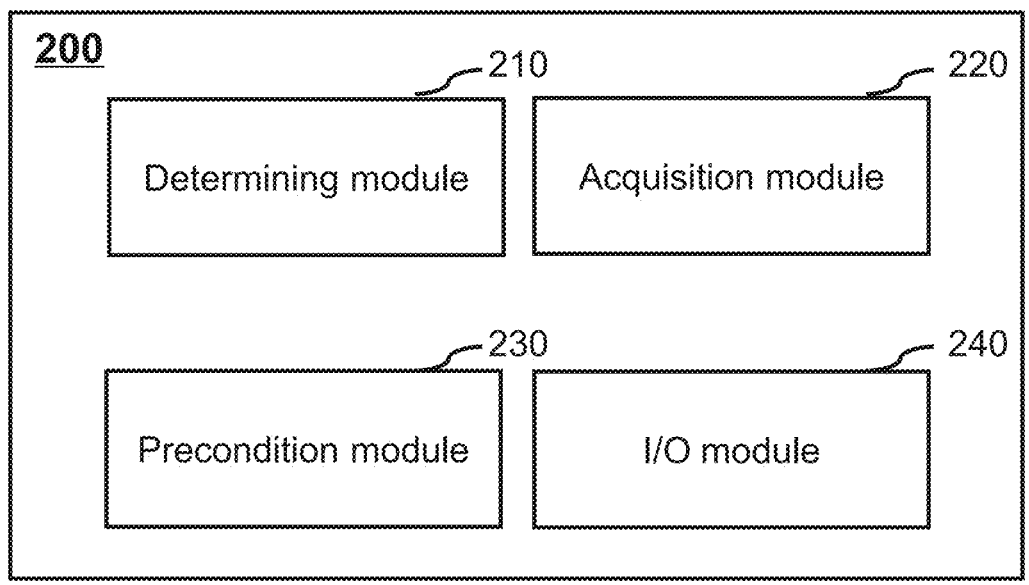
FIG. 2 is a block diagram illustrating an exemplary processor according to some embodiments of the present disclosure.

FIG. 2 is a block diagram illustrating an exemplary processor according to some embodiments of the present disclosure. As shown in FIG. 2, processor 200 may include a determination module 210, an acquisition module 220, a precondition module 230, and an I/O module 240. In some embodiments, the processor 200 may be implemented and executed by at least one computing device and/or at least one mobile device, such as executed by at least one processor of the at least one computing device and/or mobile device. Details of an exemplary computing device is described in FIG. 8, and details of an exemplary mobile device is described in FIG. 9. In some embodiments, the processor 200 may be operated in the device (e.g., a mobile smart phone). Each module may be a hardware circuit that is designed to perform the following actions, a set of instructions stored in one or more storage media, and/or any combination of the hardware circuit and the one or more storage media.

The determination module 210 may be configured to determine the device is moving with a vehicle. If the driver is using the device in the vehicle that is moving according to a route or an order, the device may be determined as moving with the vehicle. In some embodiments, the device may be a mobile smart phone, a personal digital assistant (PDA), a tablet computer, laptop, a carputer (board computer), a play station portable (PSP), a smart glasses, a smart watch, a wearable device, a virtual display device, a display enhanced equipment (e.g. Google™ Glass, Oculus Rift, HoloLens, Gear VR, etc.). The mobile smart phone may include a touch screen, a speaker, a microphone, an antenna, or the like, or any combination thereof. The mobile smart phone may connect to a mobile network and make phone calls. In some embodiments, the mobile smart phone may include at least one sensor. The at least one sensor may include a gyroscope, an acceleration sensor, a global position system (GPS), a gravity sensor, a light sensor, a temperature sensor, a fingerprint sensor, a heart rate sensor, a proximity sensor, or the like, or any combination thereof.

The vehicle that the device moving together with may include a private car, a taxi, a network automobile, an autonomous vehicle, an electric vehicle, a motorcycle, a bus, a train, a hitch, a bullet train, a high speed rail, a subway, a vessel, an aircraft, a spaceship, a hot-air balloon, a driverless vehicle, or the like, or any combination thereof. In some embodiments, the device may moving with the vehicle, and detect movement of the vehicle. For example, a driver of the vehicle may take a mobile smart phone when he is driving, and the device with the at least one sensor may detect the movement of the vehicle. As another example, the mobile smart phone may operate an application for carpooling, and the mobile smart phone used by a service provider (e.g., a driver) may be fixed in the vehicle for carpooling. As another example, if a passenger uses the mobile smart phone in a taxi, the mobile smart phone may be moving with the taxi, and record data associated with the taxi.

The acquisition module 220 may be configured to obtain movement data associated with the device. In some embodiments, the movement data may be encoded by the acquisition module 220 into first electronic signals. In some embodiments, the acquisition module 220 may obtain the movement data from one or more sensors of the device. The one or more sensors may include a gyroscope, an acceleration sensor, a global position system (GPS), a gravity sensor, a light sensor, a temperature sensor, a fingerprint sensor, a heart rate sensor, a proximity sensor, an image sensor, a voice sensor, an acoustic detector, or the like, or any combination thereof. The gyroscope may be an angular velocity sensor that measure a rotation angular speed when the device is spinning or inclining. The acceleration sensor may be a capacitance-type acceleration sensor, an inductance-type acceleration sensor, a strain-type acceleration sensor, a piezoresistance-type acceleration sensor, a piezoelectricity-type acceleration sensor, or the like, or any combination thereof. The GPS may include a car-carrying GPS that may be communicated with a mobile network or the network 120. The car-carrying GPS may determine movement data locating the vehicle and/or the device moving in the vehicle. The gravity sensor may include elastic-sensitive element that may cause a deformation-induced electronic signals. In some embodiments, the gravity sensor may have the same function as the acceleration sensor. Accordingly, the movement data may include information of an electronic device (e.g., a mobile smart phone and/or a vehicle data recorder that installed an application to operate the processes as introduced in the present disclosure, or a vehicle carrying the mobile smart phone), such as location, velocity, acceleration, and gesture (e.g. yaw, role, pitch movement/acceleration) of the electronic device, or the like, or any combination thereof.

In some embodiments, the movement data may be corresponding to a driving behavior or a vehicle status. For example, the driving behavior may be an aggressive driving behavior such as an aggressive acceleration (e.g., an abrupt acceleration), an aggressive braking (e.g., a sudden braking activity), an aggressive turn (e.g., an abrupt turn), a sound-related behavior, a facial expression, a motion behavior, a dressing-up behavior, a ceremonial behavior, or the like, or any combination thereof. The aggressive acceleration may be caused by the driver's continuously and/or heavily stepping on gas pedal. The aggressive braking may be caused by the driver's continuously and/or heavily stepping on brake continuously or heavily. The aggressive turn may be caused by the driver's abrupt turning of a steering wheel. The aggressive turn may include an aggressive right turn, an aggressive left turn, and/or an aggressive U-turn. For example, the aggressive right turn may be implemented by turning the steering wheel in a clockwise direction continuously. As another example, the aggressive left turn may be caused by turning the steering wheel in an anticlockwise direction heavily. In some embodiments, a driver may implement the driving behavior by a remote control (e.g., using a virtual manipulation in a remote location). The sound-related behavior, the facial expression, the motion behavior, the dressing-up behavior, and the ceremonial behavior may be described as elsewhere in the present disclosure. See, for example, FIG. 4B and the description thereof.

In some embodiments, the movement data may include gyroscope data, acceleration sensor data, GPS data, gravity sensor data, light sensor data, temperature sensor data, fingerprint sensor data, heart rate sensor data, proximity sensor data, angular acceleration data, image data, voice data, or the like, or any combination thereof. The types of movement data may correspond to sensors in the mobile smart phone. For example, the acceleration sensor in the mobile mart phone may generate or record the acceleration sensor data.

In some embodiments, the movement data generated by different sensors may be integrated or decomposed in order to describe a specified driving behavior. For example, the acceleration sensor data, the GPS data, and the gravity sensor data may be recorded and integrated corresponding to the aggressive acceleration of the driver.

In some embodiments, the movement data may correspond to the driving behavior, the vehicle status, or the road condition. For example, if a sudden road accident happens in front of the vehicle, the driver may behave the aggressive braking, and the acceleration sensor may generate a spike in its output signals and/or data at the time of the aggressive braking. In some embodiments, the driving behavior may further include a non-driving-related behavior (i.e., behaviors caused by actions other than driving related activities), such as when a user of the mobile smart phone shakes the mobile smart phone in the route. Accordingly, the output signals and/or data from the sensors of the device may also include components corresponding to the non-driving-related behavior. In some embodiments, the device may be able to distinguish the movement data corresponding to the non-driving-related behavior. For example, if the driver shakes the mobile smart phone for some reason, the mobile smart phone or a car-hailing application operating in the mobile smart phone may distinguish the shaking from the driving behavior (e.g., the aggressive turn) by analyzing features (e.g., a duration) of the movement data.

The precondition module 230 may be configured to operate logic circuits in the module or other modules in the processor to determine whether the first electronic encoding movement data meets a precondition. The precondition may be used to activate data transmission, i.e., whether the sensor or device start to transmit or record the movement data (or alert data). The precondition may be predetermined by a user or by default. In some embodiments, the precondition may include a threshold of the linear acceleration, a threshold of the lasting time of the linear acceleration, a threshold of the angular acceleration, a threshold of the lasting time of the angular acceleration, a number of changes of an acceleration direction during a predetermined length of time Δt, a number of changes of a gesture with a time length, a frequency of keyword, a facial expression mode, a control instruments, a meaning of sound, a motion speed of the user (e.g., the driver), a distance of the driver and the passenger, or the like, or any combination thereof. The linear acceleration may be determined as a linear acceleration sensor data that may be decomposed in a three-dimensional coordinate with an X coordinate axis, a Y coordinate axis, and a Z coordinate axis. For example, the linear acceleration may include X linear acceleration, Y linear acceleration, or Z linear acceleration. The threshold of linear acceleration may include a threshold of the X linear acceleration, a threshold of Y linear acceleration, a threshold of Z linear acceleration, or combinations thereof. In some embodiments, the precondition may include one or more sub-preconditions, e.g., a first sub-precondition and a second sub-precondition. Merely by way of example, the threshold of the linear acceleration, the threshold of the lasting time of the linear acceleration, the threshold of the angular acceleration, or the threshold of the lasting time of the angular acceleration may be less than the thresholds of the second sub-precondition. The frequency of keyword, the facial expression mode, the control instruments, the meaning of sound, the motion speed of the user (e.g., the driver), and the distance of the driver and the passenger may be described elsewhere in the present disclosure. See, for example, FIG. 4B and the description thereof.

The I/O module 240 may be configured to collect the movement data within a predetermined time period about the time that the precondition is met (hereinafter "the target time point"), and then send the collected movement data and/or alert data to a remote server. In some embodiments, the movement data and/or the alert data sent by the I/O module 240 may be encoded as the second electronic signals. In some embodiments, the movement data may be sent by the device (e.g., a mobile smart phone) or a vehicle-mounted wireless transmitting device.

In some embodiments, the predetermined time period may be used to collect or send the movement data. The predetermined time period may be varied by a user (e.g., a driver) or by default. The predetermined time period may include a starting time point A and an ending time point B (hereinafter referred to as "$t_A$" and "$t_B$"). In some embodiments, the length of the predetermined time period may be corresponding to the driving behavior. For example, if the driving behavior meets the first sub-precondition, the length of the predetermined time period may be short (e.g., 0.5 second, 1 second, 1.5 seconds, etc.). As another example, if the driving behavior triggers the second sub-precondition (e.g., the threshold of the linear acceleration), the length of the predetermined time period may be longer (e.g., 3 seconds, 4 seconds, 5 seconds, etc.).

In some embodiments, the predetermined time period may be determined based on the target time point. In some embodiments, the target time point may be a trigger time point when the movement data meets the precondition. In some embodiments, the target time point may be coincided with $t_A$. The target time point may also be a time point between $t_A$ and $t_B$, or coincided with $t_B$, etc. The length from $t_A$ to the target time point and/or the length from the target time point to $t_B$ may be determined by user or by default system setting. For example, the $t_A$ and $t_B$ may be 1 second before the target time point and 3 seconds after the target time point, respectively. Therefore, if the precondition is satisfied and the target time point is determined, the I/O module 240 may select movement data from 1 second before the target time point to 3 seconds after the target time point.

The determination module 210, the acquisition module 220, the precondition module 230, and the I/O module 240 in the processor may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, any two of the modules may be combined as a single module, and any one of the modules may be divided into two or more units.

Figure 3:
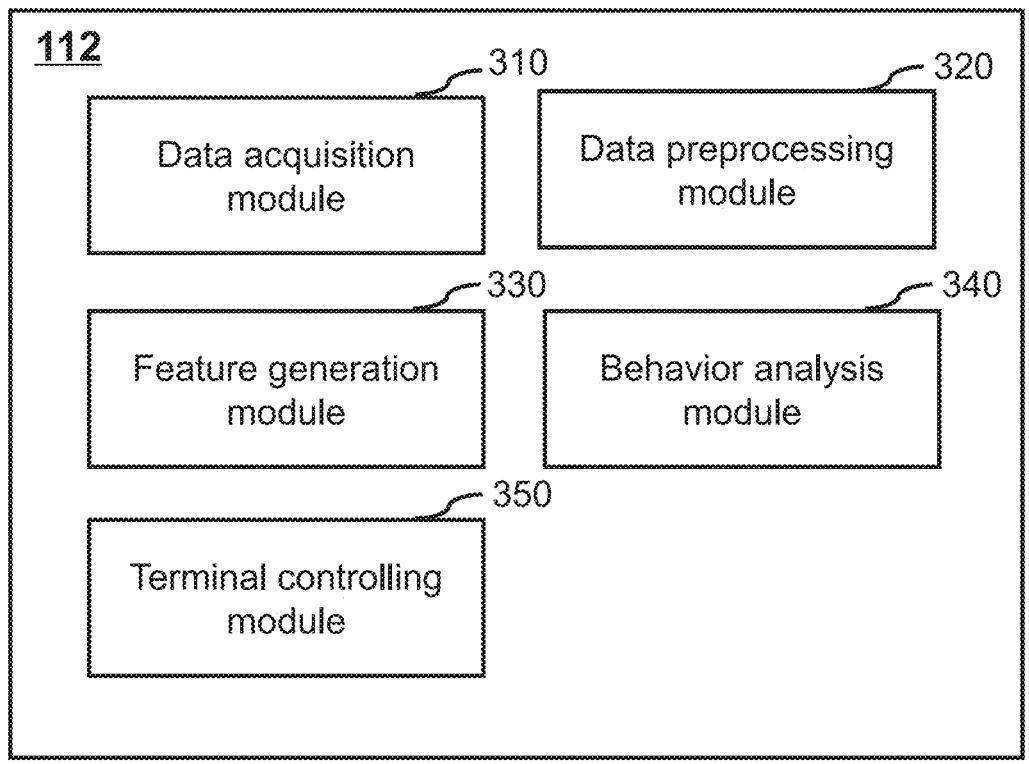
FIG. 3 is a block diagram illustrating an exemplary processing engine according to some embodiments of the present disclosure.

FIG. 3 is a block diagram illustrating an exemplary processing engine according to some embodiments of the present disclosure. As shown in FIG. 3, the processing engine 112 may include a data acquisition module 310, a data preprocessing module 320, a feature generation module 330, a behavior analysis module 340, and a terminal controlling module 350.

Figure 8:
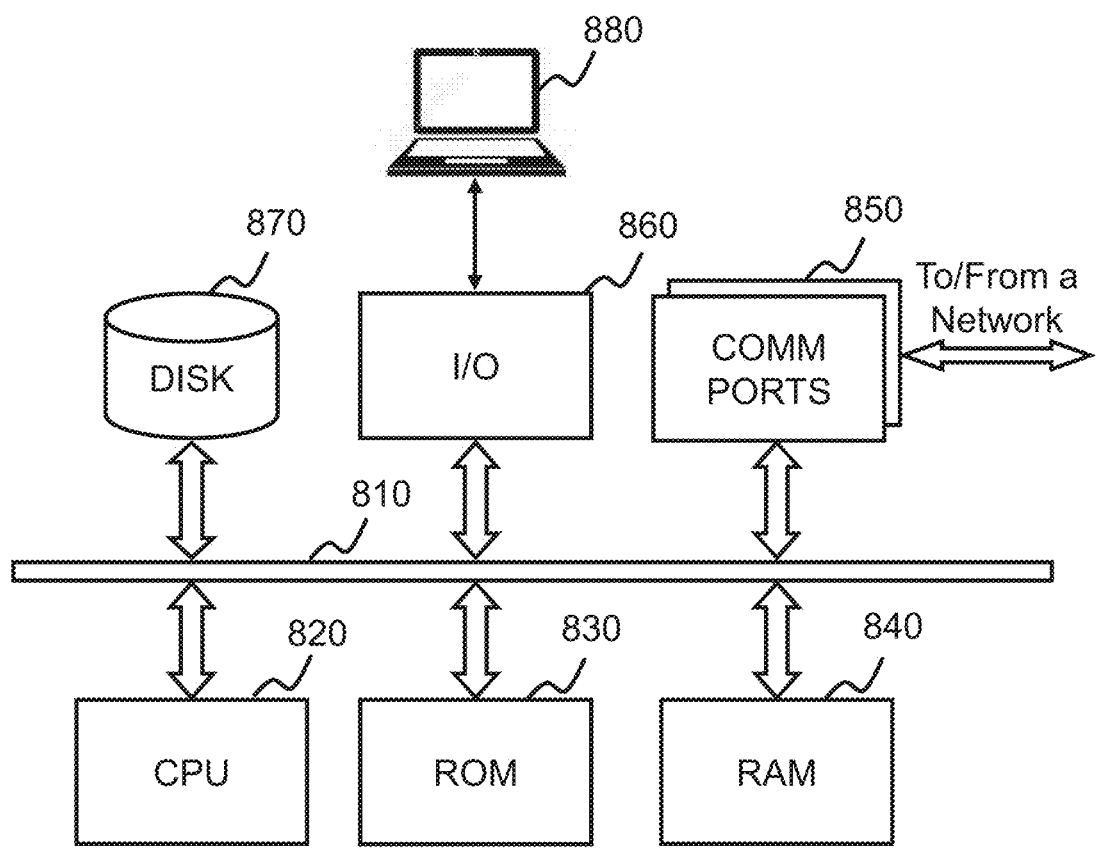
FIG. 8 is a schematic diagram illustrating exemplary hardware and/or software components of a computing device according to some embodiments of the present disclosure.
Figure 9:
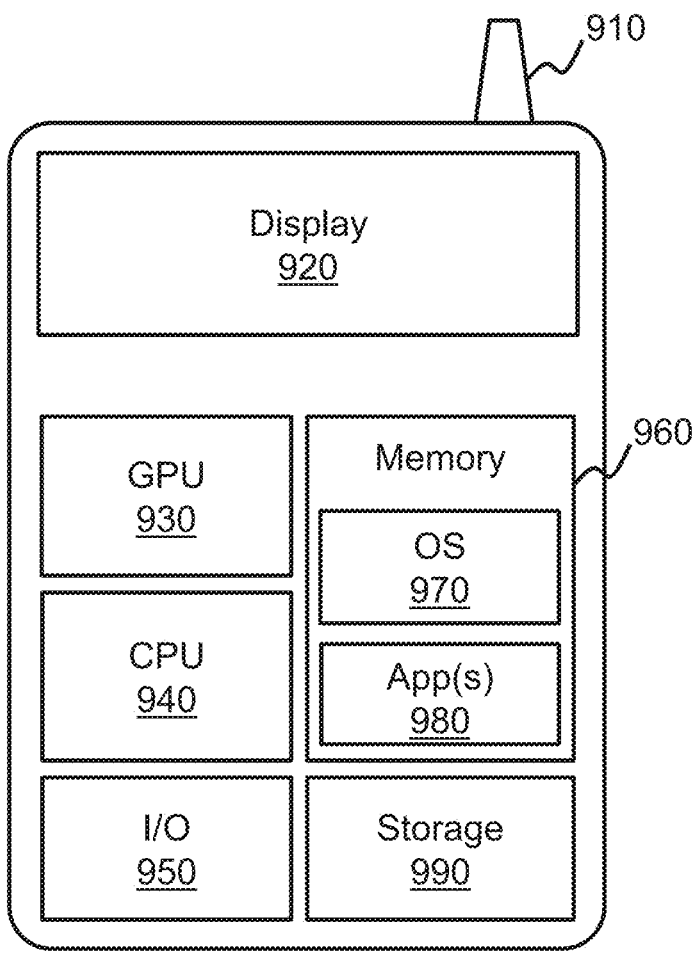
FIG. 9 is a schematic diagram illustrating exemplary hardware and/or software components of an exemplary mobile device on which a user terminal may be implemented according to some embodiments of the present disclosure.

In some embodiments, the processing engine 112 may be implemented by and executed by at least one computing device and/or at least one mobile device, such as CPU 820 in the computing device 800 as shown in FIG. 8, CPU 940 in the mobile device 900 as shown in FIG. 9, or any component in the on-demand service system 100. Each module may be a hardware circuit that is designed to perform the following actions, a set of instructions stored in one or more storage media, and/or any combination of the hardware circuit and the one or more storage media.

The data acquisition module 310 may be configured to obtain the movement data and/or the alert data. In some embodiments, the movement data and/or the alert data may be encoded as the second electronic signals by the processing engine 112. In some embodiments, the movement data and/or the alert data may be received from the I/O module 240 that may be installed in the device or the vehicle. In some embodiments, the movement data may include gyroscope data, acceleration sensor data, GPS data, gravity sensor data, light sensor data, temperature sensor data, fingerprint sensor data, heart rate sensor data, proximity sensor data, or the like, or any combination thereof. In some embodiments, the alert data may be the same as the collected movement data. In some embodiments, the alert data may include description of the driver behavior, level of the danger, type of the driver behavior, consequence, whether the driver need a behavioral intervention, whether the system or someone monitoring the driver (e.g., the server 110) needs to call the police to regulate the driver, or the like, or any combination thereof.

The data preprocessing module 320 may be configured to preprocess the movement data based on a filtering model. In some embodiments, the movement data may be encoded into the second electronic signals. The data preprocessing module 320 may filter out unwanted information from the encoding movement data. The unwanted information may be noise information generated by non-driving-related behavior such shaking the mobile smart phone, dropping the mobile smart phone onto a bottom of the vehicle, or an electronic malfunction of the mobile smart phone, etc. The unwanted information may be distinguished from information that may be used to analyze the driving behavior. In some embodiments, the unwanted information may be filtered out by determining movement character of the mobile smart phone. In some embodiments, the unwanted information may be filtered out based on the acceleration sensor data. For example, if the driver shakes the mobile smart phone, the mobile smart phone may generate the acceleration sensor data in a three-dimensional coordinate, the data preprocessing module 320 may analyze the acceleration sensor data in order to obtain an acceleration sensor data in a horizontal plane (e.g., $O_{x-y}$). If the acceleration sensor data in the horizontal plane varies by a frequency higher than a reference frequency, the acceleration sensor data may be determined as movement data of shaking the mobile smart phone, and the acceleration sensor data may be filtered out by the data preprocessing module 320. In some embodiments, the unwanted information may be filtered out by detecting at least one applications. For example, if the mobile smart phone detects the application (e.g., a mobile game) operating in a time interval, the movement data in the time interval may be determined as unwanted information, and the unwanted information may be filtered out by the data preprocessing module 320.

In some embodiments, the data preprocessing module 320 may filter out the unwanted information by using a filtering model. The filtering model may include a decision tree, an association rule, an artificial neural network, a deep learning, an inductive logic programming, a support vector machine, a clustering, a Bayesian network, a reinforcement learning, a representation learning, a similarity and metric learning, a sparse dictionary learning, a genetic algorithm, a rule-based machine learning, or the like, or any combination thereof. For example, the data preprocessing module 320 may use the support vector machine to determine the unwanted information. The support vector machine may be trained offline based on movement data in order to recognize unwanted information.

In some embodiments, the filtering model may be trained offline in the remote server, and sent to an electronic device, a storage, or the like, or any combination thereof. The electronic device may be a mobile smart phone that may operate an application (App) for carpooling and may have a smart storage (e.g., the SD card) for storing the instructions associated to the filtering model. The storage for storing the filtering model may include a mass storage (e.g., a magnetic disk, an optical disk, or a solid-state drives), a removable storage, (e.g., a flash drive, a floppy disk, an optical disk, a memory card, a zip disk, or a magnetic tape), a volatile read-and-write memory, a read-only memory (ROM), or the like, or any combination thereof. In some embodiments, the filtering model may be stored in a cloud server that may be communicated with the device or vehicle in real time. For example, the unwanted information may be filter out by analyzing the movement data using the filtering model online.

The feature generation module 330 may be configured to generate feature data based on the filtered movement data. The feature data may be used to train a machine learning trained model. In some embodiments, the feature data may include a vector, a determinant, a matrix, or the like, or any combination thereof.

The behavior analysis module 340 may be configured to analyze driving behavior based on the machine learning trained model and the feature data. The driving behavior may include an aggressive acceleration, an aggressive braking, an aggressive turn, or the like, or any combination thereof. In some embodiments, the behavior analysis module 340 may determine a behavior evaluation corresponding the driving behavior. The behavior evaluation may be used to assess the driving behavior or rank a level of service. For example, if the behavior evaluation of a first driver is higher than that of a second driver, the level of service of the first drive may be higher than that of the second driver. In some embodiments, the behavior evaluation may include statistic data, a driving score corresponding to each of the route, or times of danger behavior. The statistical data may include times of the aggressive acceleration, times of the aggressive braking, times of the aggressive turn, or the like, or any combination thereof. The driving score may be represented as a number, a percentage, a text, a level, or the like, or any combination thereof. In some embodiments, the times of danger behavior may be used to remind the driver of dangerous driving.

In some embodiments, the machine learning trained model may be used to analyze any data related to driving behavior, vehicle status, or road status. For example, an automobile manufacturer may collect vehicle-related data by using the machine learning trained model to delete the unwanted information. As another example, a traffic management department may use selected road-related information by using the machine learning trained model to filter out the unwanted information. As still another example, an online on-demand service platform (e.g., an online carpooling service platform, or an online bicycle-sharing service platform) may record user-behavioral data for ranking users by using the machine learning trained model to filter out the unwanted information. As still another example, the on-demand service system 100 may use the road-related condition, or the vehicle-related data to generate a plurality of suggestions (e.g., suggestions to the driver for safe driving, or suggestions to traffic management bureau for designing a new road etc.).

In some embodiments, the machine learning trained model may be updated online or offline. After the machine learning trained model has been trained, the machine learning trained model may be further updated by using the movement data obtained in real time or in a periodical time interval (e.g., each day, or each week). In some embodiments, the machine learning trained model may be further updated into at least one of machine learning trained sub-model that may be corresponding to different types of the unwanted information. For example, a first sub-model may be used to distinguish the unwanted information associated with the vehicle, and a second sub-model may be used to distinguish the unwanted information associated with the mobile smart phone.

The terminal controlling module 350 may be configured to control the MIS terminal or the vehicle data recorder. In some embodiments, the terminal controlling module 350 may receive the alert data from the vehicle data recorder or the MIS terminal. The alert data may be used to remind the remote server or MIS terminal.

In some embodiments, after obtaining the alert data, the terminal controlling module 350 may analyze the alert data and send an instruction to the vehicle data recorder or the MIS terminal. The instruction sent by the terminal controlling module 350 may include whether to trigger the vehicle data recorder to generated a video, how to generate the video, who is main object in the video, whether to store the video, whether to submit the video, whether someone monitoring the driver (e.g., the server 110) needs to call a police, or the like, or any combination thereof. The instruction sent by the terminal controlling module 350 may be detailed in FIG. 4B.

The data acquisition module 310, the data preprocessing module 320, the feature generation module 330, and the behavior analysis module 340 in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, any two of the modules may be combined as a single module, and any one of the modules may be divided into two or more units.

Figure 4A:
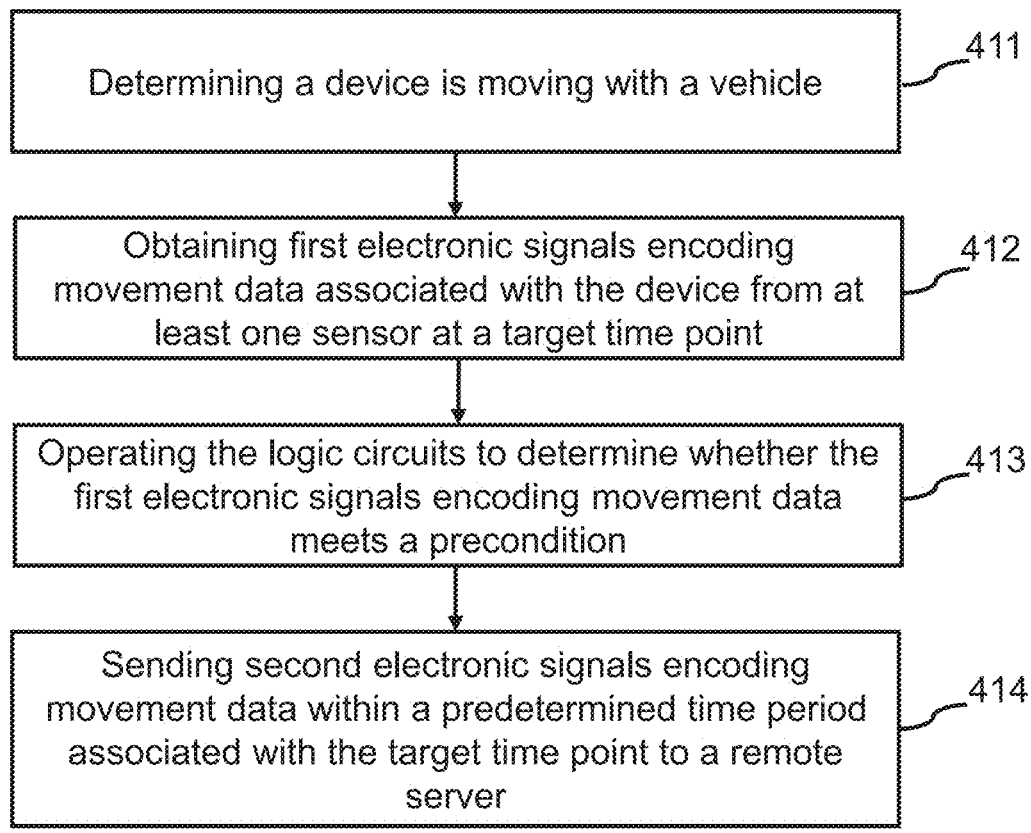
FIG. 4A is a flowchart illustrating an exemplary process for processing movement data according to some embodiments of the present disclosure.

FIG. 4A is a flowchart illustrating an exemplary process for processing movement data according to some embodiments of the present disclosure. As shown in FIG. 4A, process 410 for processing movement data may include determining a device moving with a vehicle, obtaining the first electronic signals encoding movement data, determining whether the first electronic encoding movement data meets a precondition, and sending second electronic signals encoding movement data to a remote server.

In 411, the determination module 210 may determine the device is moving with the vehicle. The 411 may be implemented by an electronic device, such as the processor 200, the CPU 820 in the computing device 800, the CPU 940 in the mobile device 900, the device (e.g., the mobile smart phone), or any component in the on-demand service system 100.

The vehicle may include a private car, a taxi, a network automobile, an autonomous vehicle, an electric vehicle, a motorcycle, a bus, a train, a hitch, a bullet train, a high-speed rail, a subway, a vessel, an aircraft, a spaceship, a hot-air balloon, a driverless vehicle, or the like, or any combination thereof, or the like, or any combination thereof. In some embodiments, the device may be moving with the vehicle, and detect movement of the vehicle. For example, a driver of the vehicle may take a mobile smart phone when he is driving, and the device with the at least one sensor may detect the movement of the vehicle. As another example, the mobile smart phone may operate an application for carpooling, and the mobile smart phone used by a service provider (e.g., a driver) may be fixed in the vehicle for carpooling. As another example, if a passenger may use the mobile smart phone in a vehicle, the mobile smart phone may be moving with the vehicle.

In 412, the acquisition module 220 may obtain the movement data associated with the device from at least one sensor at a target time point. In some embodiments, the movement data may be encoded by the acquisition module 220 into the first electronic signals. In some embodiments, a driver may implement the driving behavior by a remote control (e.g., using a virtual manipulation in a remote location).

The movement data may include gyroscope data, acceleration sensor data, GPS data, gravity sensor data, light sensor data, temperature sensor data, fingerprint sensor data, heart rate sensor data, proximity sensor data, angular acceleration data, sound data, or the like, or any combination thereof. In some embodiments, the movement data may correspond to the driving behavior, the vehicle status, or the road condition. For example, if a road accident suddenly happens in front of the vehicle, the driver may behave the aggressive braking, and the acceleration sensor may sense the aggressive braking. Accordingly, the output electronic signals and/or data from the acceleration sensor may show a spike at the time of the aggressive braking. The processor 200 may collect the output movement data from the sensors and save the corresponding sensor data in a storage medium, such as a cache and/or a hard disk of the electronic device. For example, the processor 200 may continuously collect and update the output electronic signals output by the sensors from a first predetermined time period before the present time to a second predetermined time period after the present time.

In some embodiments, the movement data generated by different sensors may be integrated for describing a specified driving behavior. For example, the acceleration sensor data, the GPS data, and the gravity sensor data may be recorded and integrated corresponding to the aggressive acceleration of the driver. In some embodiments, the driving behavior may further include a non-driving-related behavior, such as shaking the mobile smart phone in the route, and the non-driving-related behavior may also generate corresponding movement data. In some embodiments, the movement data corresponding to the non-driving-related behavior may be distinguished by the device. For example, if the driver shakes the mobile smart phone, the mobile smart phone or a car-hailing application operating in the mobile smart phone may distinguish the shaking from the driving behavior (e.g., the aggressive turn) by analyzing features (e.g., duration and/or acceleration features) of the movement data.

In some embodiments, the movement data may be corresponding to a driving behavior or a vehicle status. For example, the driving behavior may be predefined driving behavior. The predefined driving behavior may include aggressive driving behaviors such as an aggressive acceleration (e.g., an abrupt acceleration), an aggressive braking (e.g., a sudden and heavy braking action), an aggressive turn (e.g., an abrupt turn), or the like, or any combination thereof. The aggressive acceleration may be caused by the driver's continuously and/or heavily stepping on gas pedal. The aggressive braking may be caused by continuously and/or heavily stepping on brake. The aggressive turn may be caused by abrupt turning of a steering wheel. The aggressive turn may include an aggressive right turn, an aggressive left turn, and an aggressive U-turn. For example, the aggressive right turn may be implemented by turning the steering wheel in a clockwise direction continuously. As another example, the aggressive left turn may be caused by turning the steering wheel in an anticlockwise direction heavily.

In some embodiments, the driving behavior may correspond to the vehicle status that may include a tire puncture, a line fault, an engine failure, an empty tank, a sudden absence of electrical power, a brake failure, a throttle fault, or the like, or any combination thereof. For example, an aggressive right turn may correspond to the tire puncture that may induced by a high temperature in a road.

In some embodiments, the drive behavior may be associated with a road condition including a sudden red traffic light, a traffic jam, a rushing out of a person, a sudden road accident, a bumpy road, a winding road, or the like, or any combination thereof. For example, the aggressive braking may correspond to a traffic jam in a rush hour. As another example, if a driver is on a winding road reaching a peak that may be along a mountainside, the driver may behave the aggressive turn continuously.

In some embodiments, the acquisition module 220 may determine the target time point by analyzing the movement data associated with the drover behavior. For example, if a driver makes an aggressive turn in 5 p.m., the acquisition module 220 may determine the 5 p.m. as the target time point. In some embodiments, the acquisition module 220 may determine the target time point as the same time or substantially the same time when the aggressive driving behavior is detected. For example, when the acquisition module 220 obtain a speed data up to 85 kilometers per hour at 5 a.m. with a speed limitation of 70 kilometers per hour, the acquisition module 220 may determine the target time point as 5 a.m. (or 4:59 a.m.), which may record the driving behavior more precisely. In some embodiments, the movement data may include at least one time label that may record a corresponding time for each item of the movement data, and the target time point may be determined by analyzing the time label corresponding to a specified movement data. In some embodiments, the acquisition module 220 of the processor 200 may collect and generate the movement data in a periodical time interval (e.g., per 100 milliseconds) that may include a period or a frequency.

In 413, the precondition module 230 may operate the logic circuits to determine whether the first electronic encoding movement data meets a precondition. The precondition may be used to determine whether the processor 200 should collect the movement data and send the collected movement data to a remote receiving device.

The precondition may be predetermined by a user or by system default settings. In some embodiments, the precondition may include a threshold of the linear acceleration, a threshold of the lasting time of the linear acceleration, a threshold of the angular acceleration, a threshold of the lasting time of the angular acceleration, a number of changes of an acceleration direction during a predetermined length of time $\Delta t$, or a number of changes of a gesture with a time length. The predetermined length of time $\Delta t$ may be a value (e.g., 1 millisecond, 10 milliseconds, 100 milliseconds, 1 second, 10 seconds, etc.) set by a user or by default. The processor 200 may determine the linear acceleration by decoding data from electronic signals collected from a linear acceleration sensor. For example, the processor 200 may decompose the data into components in a three-dimensional coordinate (an X coordinate axis, a Y coordinate axis, and a Z coordinate axis), i.e. the processor 200 may decompose the linear acceleration into X linear acceleration, Y linear acceleration, or Z linear acceleration. Accordingly, the threshold of linear acceleration may include a threshold of the X linear acceleration, a threshold of Y linear acceleration, or a threshold of Z linear acceleration. In some embodiments, the threshold of linear acceleration may include a value, a range, a function, or the like, or any combination thereof. For example, the threshold of linear acceleration may be set as 10 m/s$^2$. Therefore, the acceleration sensor data greater than 10 m/s$^2$ may satisfy the precondition. In some embodiments, the threshold of the lasting time of the linear acceleration may be time duration from a time when the acceleration is greater than 0 or a predetermined value. The threshold of the lasting time of the linear acceleration may include 1 second, 5 seconds, 30 seconds, 1 minute, 3 minutes, or any time duration when the vehicle is in an accelerated status. For example, if the threshold of the lasting time of the linear acceleration is 5 seconds, then the X linear acceleration that is greater than 0 and lasts 8 seconds may satisfy the precondition. The angular acceleration may be determined as an angular acceleration sensor data that may be presented as a clockwise angular acceleration and an anticlockwise angular acceleration. In some embodiments, the threshold of angular acceleration may include a threshold of the clockwise angular acceleration and a threshold of the anticlockwise angular acceleration. For example, the threshold of angular acceleration may be 5 radian/s$^2$, 12 radian/s$^2$, 45 radian/s$^2$, etc. The lasting time of the angular acceleration may be time duration when the clockwise angular acceleration or the anticlockwise angular acceleration is a non-zero value. The threshold of the lasting time of the angular acceleration may include 10 seconds, 30 seconds, 50 seconds, 1 minute, 3 minutes, or any time duration when the vehicle is in an angular accelerated status. If the threshold of the lasting time of the angular acceleration is set as 30 seconds, then the angular acceleration with a 35 duration may meet the precondition. The number of changes of the acceleration direction between the predetermined time period Δt may be preset as 3, 5, 8, or any integer number. If the driver changes the direction of the vehicle, the sensor may generate the movement data corresponding to changes of a direction of acceleration, and the number of changes of the acceleration direction may further be counted during the predetermined time period Δt. If the threshold number of changes of an acceleration direction is 3 and the predetermined time period Δt is 10 seconds, then within 10 seconds movement data that changes 3 or more times of direction may satisfy the precondition.

The precondition to trigger the movement data transmission may also be a comprehensive one that incorporating thresholds of linear acceleration, angular acceleration, lasting time of these accelerations, the predetermined time period Δt, or any other applicable movement measurements of the electronic device. Further, the precondition may be a result of a trained model based on sampling data. For example, the precondition may be the result of a trained neural network model or a result of machine learning based on historical driving behavior of various drivers. The precondition may vary according to different models and parameters in the models.

In some embodiments, the precondition may include one or more sub-preconditions, e.g., a first sub-precondition and a second sub-precondition. Merely by way of example, the threshold of the linear acceleration, the threshold of the lasting time of the linear acceleration, the threshold of the angular acceleration, or the threshold of the lasting time of the angular acceleration may be less than the thresholds of the second sub-precondition.

In 414, the I/O module 240 may send the movement data within a predetermined time period associated with the target time point to a remote server. In some embodiments, the movement data sent by the I/O module 240 may be encoded into the second electronic signals. In some embodiments, the movement data may be sent by the device (e.g., a mobile smart phone) or a vehicle-mounted wireless transmitting device. For example, the mobile smart phone may send the movement data via a mobile wireless network.

The predetermined time period may be determined by a user (e.g., a driver) or by default. The predetermined time period may include a starting time point A and an ending time point B (hereinafter referred to as "$t_A$" and "$t_B$"). In some embodiments, the length of the predetermined time period may be corresponding to the driving behavior. For example, if the driving behavior meets the first sub-precondition (e.g., a threshold of the linear acceleration reflecting predefined less dangerous abnormal driving behaviors), the length of the predetermined time period may be short (e.g., 0.5 second, 1 second, 1.5 seconds, etc.). As another example, if the driving behavior triggers the second sub-precondition (e.g., a threshold of the linear acceleration reflecting predefined highly dangerous abnormal driving behavior), the length of the predetermined time period may be longer (e.g., 3 seconds, 4 seconds, 5 seconds, etc.).

In some embodiments, $t_A$ and/or $t_B$ may correspond to a starting time and an end time of the predetermined time period. $t_A$ and $t_B$ may be determined based on the target time point. In some embodiments, the target time point may be coincided with $t_A$, $t_B$, or within the time range of $[t_A, t_B]$. The length from $t_A$ to the target time point and/or the length from the target time point to $t_B$ may be determined by user or by default system setting. For example, the $t_A$ may be 1 second ahead of the target time point and $t_B$ may be 3 seconds after the target time point. Therefore, if the precondition is satisfied and the target time point is determined, the I/O module 240 may select movement data from 1 second before the target time point to 3 seconds after the target time point.

In some embodiments, if an abnormal driving behavior lasts long enough, because the processor 200 continuously receiving the electronic signals from the sensor, the precondition may continuously trigger the collection and sending of the movement data. For example, if the predetermined time period is set as from 1 second before to d3 seconds after an occurrence that the precondition is met, then, for an abnormal driving behavior, the processor 200 may determine the precondition is met at time $t_0$, $t_0+3$, and $t_0+6$ second. Accordingly the I/O module 240 may continuously send the selected movement data for 3 times (i.e., at $t_0$, $t_0+3$, and $t_0+6$) during the 10 seconds.

The processor 200 may continuously receive the movement data from the sensors and then save the movement data in a storage medium, such as a cache or a hard disk. The cache or hard disk may store movement data of the entire trip of the electronic device. Alternatively, the processor may direct the cache or hard disk to save only a predetermined length of the movement data. For example, the predetermined length of the movement data may be movement data 2 second before and 4 seconds after the current moment. When the precondition is met, the processor may select the needed movement data (e.g., 1 second before the current time to 3 seconds after the current time) from the cache or hard disk, and then send the needed movement data to the remove server.

In some embodiments, the movement data selected to be sent to the remote server may be stored in the device, a cloud storage, a secure digital (SD) card, a trans-flash (TF) card, or any storage medium in the device or the vehicle. For example, if the vehicle is driving in a mountainous area unconnected with network 120, the selected movement data within the predetermined time period may be stored in the SD card of the mobile smart phone, and the movement data may be transmitted to the remote server immediately when the network is connected. In some embodiments, the device or the vehicle may have an on-board diagnostics (OBD) that may store and/or send the movement data in the constant transmitting frequency or a varying transmitting frequency. For example, if the vehicle mounted the OBD is in a low power status, the OBD may send the movement data with a low transmitting frequency. As another example, the user (e.g., the driver) may adjust the OBD to send the movement data by a high transmitting frequency.

In some embodiments, before sending the movement data to the remote server, unwanted information may be filtered from the movement data based on, for example, a machine learning trained model. In some embodiments, the unwanted information may be noise information generated by the accidental driving behavior such as shaking the mobile smart phone, dropping the mobile smart phone onto a bottom of the vehicle, or an electronic malfunction of the mobile smart phone etc. The unwanted information may be distinguished from information that may be used to analyze the driving behavior. The machine learning trained model may be found elsewhere in the present disclosure. See, for example, FIG. 5 and description thereof.

In some embodiments, the process 410 may be stored as a set of instructions in a non-transitory computer readable medium embodying a computer program product. The non-transitory computer readable medium may communicate with a computer device and/or a user terminal (e.g., the device). When the instructions associated with the process 410 is executed, the computing device may determine a device is moving with a vehicle, obtain the movement data associated with the device from at least one sensor at a target time point, operate the logic circuits to determine whether the first electronic encoding movement data meets a precondition, and send the movement data within a predetermined time period associated with the target time point to a remote server. More detail about the process 410 may be found the description of FIG. 4A.

Figure 4B:
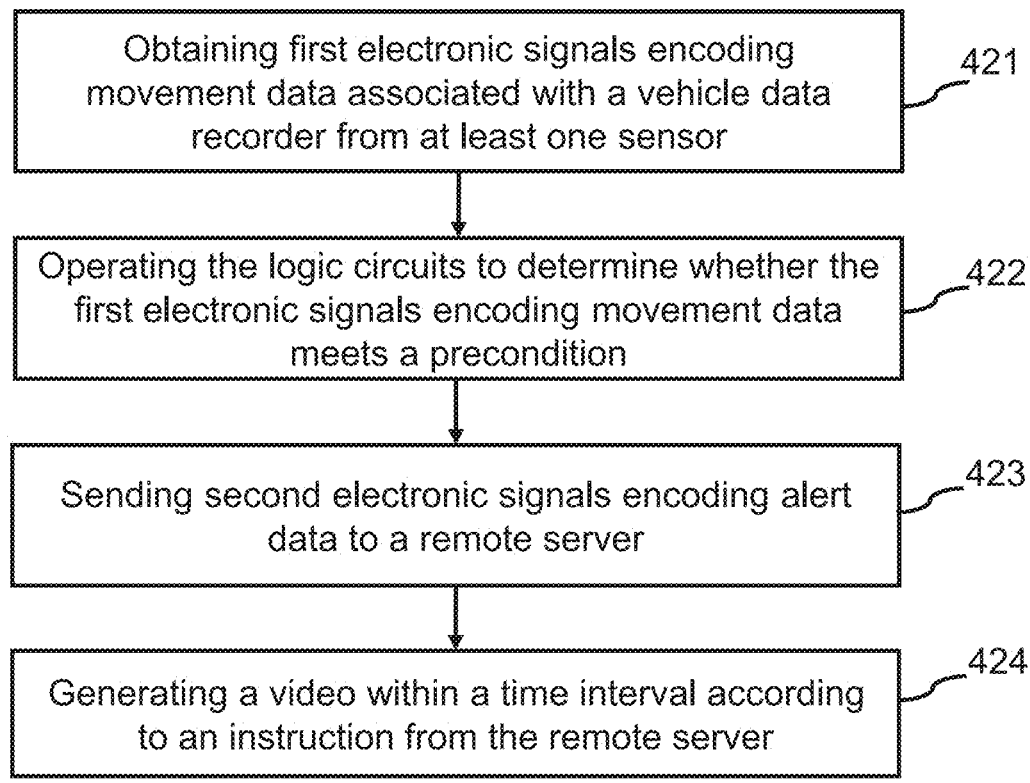
FIG. 4B is a flowchart illustrating an exemplary process for processing movement data according to some embodiments of the present disclosure.

FIG. 4B is a flowchart illustrating an exemplary process for processing the movement data according to some embodiments of the present disclosure. As shown in FIG. 4B, process 420 for processing movement data may include obtaining a first electronic signals encoding movement data associated with a vehicle data recorder, determining whether the movement data meets a precondition, sending a second electronic signal encoding alert data to a remote server, and generating a video within a time interval according to an instruction from the remote server. The process 420 may be implemented by a device, such as the processor 200, the CPU 820 in the computing device 800, the CPU 940 in the mobile device 900, a vehicle data recorder, or any component in the on-demand service system 100.

In 421, the acquisition module 220 may obtain the movement data associated with the vehicle data recorder. In some embodiments, the movement data may be encoded by the first electronic signals. The vehicle data recorder may include a camera, a display, an input/output, a processor, a power, a memory, or the like, or any combination thereof. The camera may include a visible light camera, an infrared camera, a digital camera, a 2D cameras, a 3D camera, a panoramic camera, a VR camera, a web camera, an instant picture camera, an electronic eye, a camcorder, a thermal imaging device, a visible imaging device, or the like, or any combination thereof. For example, the visible light camera may include a card digital camera, a manual camera, an auto focus camera, a telephoto camera, a wide field camera, a single lens reflex (SLR) camera, a digital single lens reflex (DSLR) camera, or the like, or any combination thereof. As another example, the infrared camera may record the movement data or a video based on electromagnet waves with various wavelengths and/or frequencies (e.g., radio waves, microwaves, infrared radiation, visible light, ultraviolet radiation, X-rays, or gamma rays). In some embodiments, the vehicle data recorder may be installed on the outside surface of the vehicle. For example, the vehicle data recorder may be located in a former windshield of the vehicle, or a back windshield of the vehicle. In some embodiments, the vehicle data recorder may be fixed within the vehicle. For example, the vehicle data recorder may be installed on the inside of the former windshield. As another example, the vehicle data recorder may be fixed before the driver or the passenger.

In some embodiments, position of vehicle data recorder may be adjusted by a user (e.g., a driver), or the on-demand service system 100. In some embodiments, the vehicle data recorder may adjust the camera in order to capture an object in am image or a video. For example, the camera of the vehicle data recorder may scan from a left to a right to generate the video including the driver in driving seat and the passenger in the passenger seat. In some embodiments, the vehicle data recorder may switch the camera from the visible light camera to the infrared camera in order to obtain a sharp image in the night. In some embodiments, the vehicle data recorder may include one or more cameras. The one or more camera may be located in different place within the vehicle. For example, the vehicle data recorder may include a first camera and a second camera, the first camera may located in an upper left corner, and the second camera may located in an upper right corner. As another example, the vehicle data recorder may generate the video by using the first camera in one time and the second camera in a next time alternately.

In some embodiments, the vehicle data recorder may obtain the movement data from at least one sensor. The at least one sensor may be sensors in the device (e.g., the mobile smart phone, OBD, ADAS, the laser radar, etc.) or sensors in the vehicle data recorder. For example, the sensors in the mobile smart phone may include the gyroscope, the acceleration sensor, the GPS, the gravity sensor, the light sensor, the temperature sensor, the fingerprint sensor, the heart rate sensor, the proximity sensor, the acoustic detector, the image sensor, the voice sensor, or the like, or any combination thereof. The sensors in the mobile smart phone may be detailed in the acquisition module 220. In some embodiments, the vehicle data recorder may be connected with the sensors in the mobile smart phone. For example, the vehicle data recorder may connect to the acceleration sensor in the smart phone, and the movement data from the acceleration sensor. As another example, the vehicle data recorder may communicate with the sensors via the network 120 (e.g., a Bluetooth network) or by a metal cable.

In some embodiments, the movement data obtained by the sensors in 421 may associated with a user behavior. The user behavior may include a driver behavior or a passenger behavior. In some embodiments, the driver behavior may be associated with the driving behavior detailed in the acquisition module 220. In some embodiments, the user behavior may also include a sound-related behavior, a facial expression, a motion behavior, a dressing-up behavior, a ceremonial behavior, or the like, or any combination thereof. The sound-related behavior may include a driver voice, a passenger voice, a passerby voice, a radio sound, a loud-speaker sound, an electronic sound, or the like, or any combination thereof. For example, if the passenger is talking with the driver in the vehicle, the passenger voice may be recorded by the vehicle data recorder and may be used to generate the corresponding movement data. As another example, if the driver recorded his/her voice in a sounds converter that may converter human voice into corresponding electronic sound, and plays the electronic sound to the passenger, the vehicle data recorder may obtain the electronic sound and generate the corresponding movement data. In some embodiments, the sound-related behavior may also include a police whistle that may indicate a police enforcement. In some embodiments, the sound-related behavior may be a gun-shot sound. For example, if the driver or the passenger is shooting by using a gun, the gun-shot sound may be detected and recorded by the vehicle data recorder. In some embodiments, the passenger voice may be detected and recorded when the passenger is arguing with, praying to or talking with the driver. For example, if the passenger is arguing with the driver violently, the passenger voice such as cry for help, angry curses, etc. may be detected and recorded by the vehicle data recorder in 421 as part of the movement data.

The facial expression may be recognized or detected by the camera of the vehicle data recorder. The facial expression may be formed by facial movement. The facial expression may include a happy face, an angry face, a scared face, a surprised face, a depressed face, an excited face, a drunk face, a contemptuous face, an insensible face, or the like, or any combination thereof. For example, if the driver has drunk great amount of liquor, the facial expression may be recognized as a drunk face, and the vehicle data recorder may determine the movement data corresponding to the drunk face. As another example, if the driver threatens the passenger that may express the scared face, the passenger's scared face may be recorded and recognized by the vehicle data recorder, and the vehicle data recorder may generate movement data or video corresponding to the scared face.

The motion behavior may be referred to as movement of the driver or the passenger. The motion behavior may include a threaten behavior, a violent behavior, a friendly behavior, or the like, or any combination thereof. The threaten behavior may include grabbing the passenger's neck, pointing to the passenger's nose, standing up in front of the passenger, or the like, or any combination thereof. For example, if the driver is a male driver and grabbing the neck of the female passenger, the threaten behavior may be detected by the vehicle data recorder, and the corresponding movement data may be generated.

The dressing-up behavior may be dressing styles of the user, such as a half-naked dressing, a formal dressing, a folk dressing (e.g., an Arab dressing), a uniform dressing (e.g., a military uniform dressing), a short skirt dressing, or the like, or any combination thereof. For example, if the driver shows the half-naked dressing and the passenger shows the short skirt dressing, the dressing-up behaviors may be recognized and be used to generate the corresponding movement data by the vehicle data recorder.

The ceremonial behavior may include any behavior related to an etiquette. The ceremonial behavior may include an inviting behavior, a rejected behavior, a worship behavior, a cheek kissing behavior, a nodding head behavior, or the like, or any combination thereof. For example, if the passenger shows the inviting behavior and the driver has no response, the vehicle data recorder may record the ceremonial behavior into corresponding movement data.

In 422, the precondition module 230 may operate the logic circuits to determine whether the movement data meets a precondition. In some embodiments, the precondition may be represented as a rule and/or a definition. In some embodiments, the rule or the definition associated with the precondition may be local or stored in the MIS. The rule may include steps how to determine the collected movement data meet the definition. For example, the rule may have three steps including collecting the movement data, analyzing the movement data, and generate the corresponding user behavior. If the vehicle data recorder is collecting the movement data, the vehicle data recorder may activate the camera and allocate a memory to store the movement data. If the vehicle data recorder is analyzing the movement data, the vehicle data recorder may download an algorithm for analysis from the network 120, and select an analyzing mode to recognize the movement data. If the vehicle data recorder is generating the corresponding movement data, the vehicle data recorder may send the movement data to a remote server or send the movement data to a cloud.

In some embodiments, the definition of the precondition may include a frequency of keyword, a facial expression mode, a control instruments, a meaning of sound, a motion speed of the user (e.g., the driver), a distance of the driver and the passenger, or the like, or any combination thereof. The frequency of keyword may be a number of a keyword to be used per unit time. The frequency of keyword may include once per second, three times per minute, or 20 times per hour, or the like, or any combination thereof. For example, if the keyword is repeated 20 times in 10 minutes, then the frequency of the keyword may be twice per minute.

In some embodiments, the type of the keyword may include a number, a name, a location, a country, a code, a unit, or the like, or any combination thereof. In some embodiments, the keyword may include help, blood, sex, wallet, underwear, marijuana, morphine, police, bank, Middle East, holy war, kill, gun, guided missile, or the like, or any combination thereof. For example, if the driver threatened the passenger, the passenger voice may include crying for help, the keyword help may be recorded by the vehicle data recorder, the keyword help may meet the keyword of the precondition, and the vehicle data recorder may calculate the frequency of the keyword (e.g., the frequency of the keyword help) in per minute.

In some embodiments, the facial expression mode may include facial expression that the driver or the passenger may be in a danger. The facial expression mode may include a facial expression mode of an asphyxia, a facial expression mode of an anger, a facial expression mode of a humiliation, or the like, or any combination thereof. If the driver treats the passenger petulantly and unfriendly, the passenger may show the angry face, the vehicle data recorder may generate the corresponding movement data that may satisfy the facial expression mode of an anger.

In some embodiments, the control instruments may include guns, bullets, explosive materials, daggers, flick knives, double-edged knives, spontoons, tear traps, bows, or the like, or any combination thereof. In some embodiments, the meaning of sound may be determined by analyzing the passenger voice or the driver voice. In some embodiments, the meaning of sound may analyze sentences of the passenger voice. In some embodiments, the motion speed of the user may be determined by analyzing user in the image or the video. For example, if the motion speed of the user may be set as 2 meters per minute, speed of the diver or the passenger in the movement data or the video may be determined as 3 meters per minute, the motion speed of the user may be satisfied. In some embodiments, the distance of the driver and the passenger may be predetermined as 0.1 meter, 0.5 meter, 0.8 meter, 1 meter, etc. If the vehicle data recorder determines the movement data as 0 by calculating distance in the video or the image, the movement data may meet the distance of the driver and the passenger.

In some embodiments, the precondition module 230 may determine whether the movement data meets a precondition based on a machine learning trained model including, for example, a decision tree, an association rule, an artificial neural network, a deep learning, an inductive logic programming, a support vector machine, a clustering, a Bayesian network, a reinforcement learning, a representation learning, a similarity and metric learning, a sparse dictionary learning, a genetic algorithm, a rule-based machine learning, or the like, or any combination thereof. For example, the precondition module 230 may use the support vector machine to determine whether the movement data meets a precondition.

In 423, the I/O module 240 may send alert data to a remote server. In some embodiments, the alert data may be encoded by using the second electronic signal. The alert data may be used to remind the remote server or MIS terminal. In some embodiments, the alert data may be the same as the collected movement data. In some embodiments, the alert data may include description of the driver behavior, level of the danger, type of the driver behavior, consequence, whether the driver needs a behavioral intervention, whether someone monitoring the driver (e.g., the server 110) needs to call a police, or the like, or any combination thereof. The description of the driver behavior may be expressed as a text form that may be recognized by the remote server or the MIS terminal. For example, the vehicle data recorder may send the alert data as the passenger is in a violent danger. The level of the danger may be divided as a first level of the danger, a second level of the danger, and a third level of the danger, etc. In some embodiments, the level of the danger may also include general danger, civil danger, or criminal danger. For example, if the passenger is arguing with the driver, the alert data may be determined as the civil danger. As another example, if the driver is abusing the passenger, the alert data may be determined as the criminal danger. In some embodiments, the type of the driver behavior may include fighting, harassment, sleep, or the like, or any combination thereof. For example, if the collected movement data from the vehicle data recorder indicates the driving is napping, the alert data may be determined as sleep. In some embodiments, if the movement data indicate an emergency, the alert data may be determined as the behavioral intervention that may request an intervention such as a medical support. In some embodiments, if the movement data shows a criminal behavior obviously, the vehicle data recorder may send the alert data in order to remind the remote server of calling a police.

In some embodiments, the alert data may also include a plurality of representative images or voices to the remote server. The representative images or voices may indicate the sound-related behavior, the facial expression, the motion behavior, the dressing-up behavior, or the ceremonial behavior of the driver or the passenger. In some embodiments, the representative images may be further analyzed by the remote server to confirm the alert data is accurate.

In some embodiments, the remote server may generate an instruction according to the alert data. The instruction may include whether to trigger the vehicle data recorder to generated a video, how to generate the video, who is main object in the video, whether to store the video, whether to submit the video, or the like, or any combination thereof.

In 424, the vehicle data recorder may generate the video within a time interval according to an instruction from the remote server. The vehicle data recorder may generate the video within the time interval that may include a starting recording time and an ending recording time. The starting recording time may be determined after receive the instruction from the remote sever. For example, once the vehicle data recorder obtain the instruction that may allow the vehicle data recorder to generate the video, the camera of the vehicle data recorder may be triggered to record the video. In some embodiments, the vehicle data recorder may generate the video directly. For example, if the remote server has no response to the alert data sent by the vehicle data recorder or the remote server is unconnected, the vehicle data recorder may trigger the video directly. As another example, if the vehicle data recorder determine the passenger or the driver in an extremely status (e.g., a serious traffic accident), the vehicle data recorder may generate the video directly.

The instruction may include whether to trigger the vehicle data recorder to generated a video, how to generate the video, who is main object in the video, whether to store the video, whether to submit the video, or the like, or any combination thereof. For example, if the instruction ignores the alert data, the vehicle data recorder may be forbidden to generate the video. As another example, if the instruction acquire an infrared video, the vehicle data recorder may trigger the infrared camera to generate the infrared video. Still as another example, if the instruction indicates the passenger is the main object, the vehicle data recorder may generate the video that may track the passenger. Still as another example, if the instruction shows that submit the video in real time, the vehicle data recorder may transmit data of the video to the remote server directly via the network 120.

In some embodiments, the video may be used as an evidence. For example, if the driver is drunk, or takes a call during the driving and causes a traffic accident, an insurance company may repudiate claims of the driver according to the video. In some embodiments, the video may be used to allocate orders to the driver. For example, if the video indicates great many of dangerous behaviors, the corresponding driver may be allocate much few of the orders.

In some embodiments, the process 420 may be stored as a set of instructions in a non-transitory computer readable medium embodying a computer program product. The non-transitory computer readable medium may communicate with a computer device and/or a user terminal (e.g., the device). When the instructions associated with the process 420 is executed, the computing device may obtain a first electronic signals encoding movement data associated with a vehicle data recorder, determine whether the movement data meets a precondition, send a second electronic signal encoding alert data to a remote server, and generate a video within a time interval according to an instruction from the remote server. More detail about the process 420 may be found the description of FIG. 4B.

Figure 5:
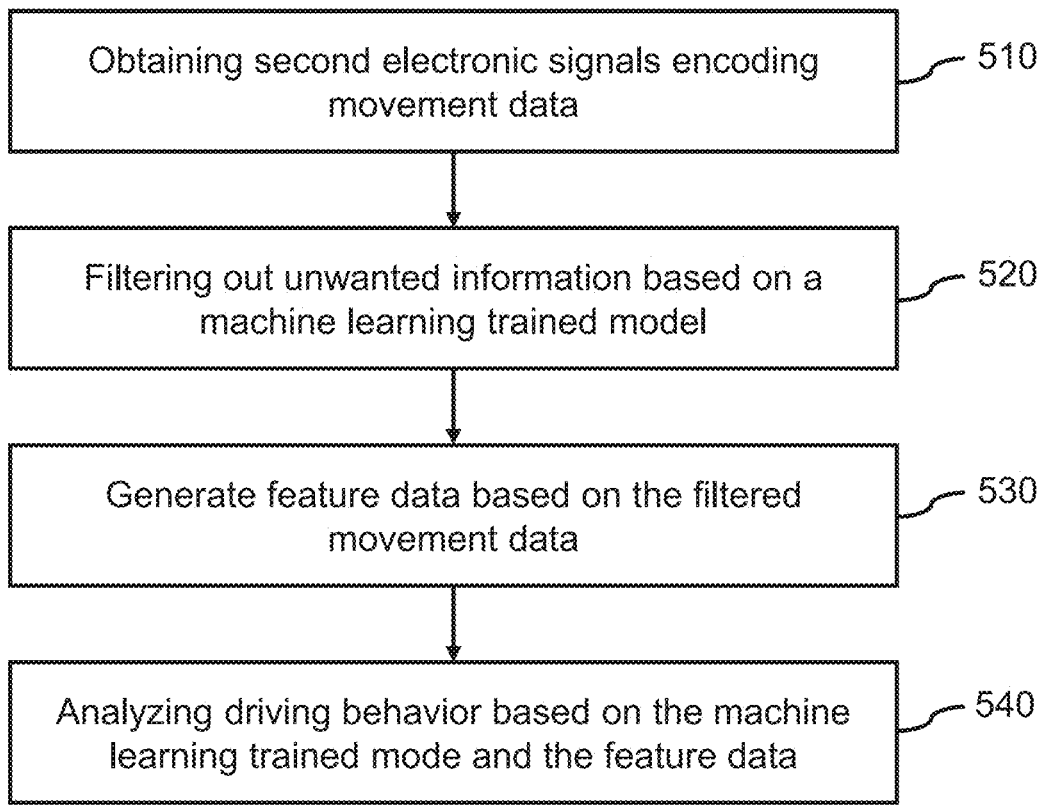
FIG. 5 is a flowchart illustrating an exemplary process for analyzing driving behavior according to some embodiments of the present disclosure.

FIG. 5 is a flowchart illustrating an exemplary process for analyzing driving behavior according to some embodiments of the present disclosure. As shown in FIG. 5, the process for analyzing driving behavior may include obtaining second electronic signals encoding movement data, filtering out unwanted information, analyzing the filtered movement data, and analyzing driving behavior based on the movement data.

In 510, the data acquisition module 310 may obtain the movement data. In some embodiments, the movement data may be encoded as the second electronic signals by the data acquisition module 310. In some embodiments, the movement data may be received from the I/O module 240 that may be installed in the device or the vehicle. In some embodiments, the movement data may include gyroscope data, acceleration sensor data, GPS data, gravity sensor data, light sensor data, temperature sensor data, fingerprint sensor data, heart rate sensor data, proximity sensor data, sound data, or the like, or any combination thereof.

In 520, the data preprocessing module 320 may preprocess the movement data based on a filtering model. For example, the data preprocessing module 320 may filter out unwanted information from the movement data.

In some embodiments, the unwanted information may be noise information generated by the accidental driving behavior such as shaking the mobile smart phone, dropping the mobile smart phone onto a bottom of the vehicle, or an electronic malfunction of the mobile smart phone etc. The unwanted information may be distinguished from information that may be used to analyze the driving behavior.

In some embodiments, the unwanted information may be filtered out by determining movement character of the mobile smart phone. The movement character may include falling plumb down or a leaving out of the vehicle. For example, if the different between a device location and a vehicle location is larger than 10 meters, the movement data generated by the sensor in the mobile smart phone may be determined as the unwanted information by the data preprocessing module 320.

In some embodiments, the unwanted information may be filtered out based on the acceleration sensor data. For example, if the driver shakes the mobile smart phone, the mobile smart phone may generate the acceleration sensor data in a three-dimensional coordinate, the data preprocessing module 320 may analyze the acceleration sensor data in order to obtain an acceleration sensor data in a horizontal plane (e.g., $O_{x-y}$). If the acceleration sensor data in the horizontal plane varies by a frequency higher than a reference frequency, the acceleration sensor data may be determined as movement data of shaking the mobile smart phone, and the acceleration sensor data may be filtered out by the data preprocessing module 320. In some embodiments, the unwanted information may be filtered out by detecting at least one applications. For example, if the mobile smart phone detects the application (e.g., a mobile game) operating in a time interval, the movement data in the time interval may be determined as unwanted information, and the unwanted information may be filtered out by the data preprocessing module 320.

In some embodiments, the unwanted information may be filtered out by using a filtering model. The filtering model may include a decision tree, an association rule, an artificial neural network, a deep learning, an inductive logic programming, a support vector machine, a clustering, a Bayesian network, a reinforcement learning, a representation learning, a similarity and metric learning, a sparse dictionary learning, a genetic algorithm, a rule-based machine learning, or the like, or any combination thereof. For example, the data preprocessing module 320 may use the support vector machine to determine the unwanted information. The support vector machine may be trained offline by movement data in order to recognize unwanted information from the movement data. In some embodiments, the data preprocessing module 320 may use an algorithm to train the filtering model.

In some embodiments, the filtering model may be trained offline in the remote server, and sent to an electronic device, a storage, or the like, or any combination thereof. The electronic device may be a mobile smart phone that may operate an application (App) for carpooling and may have a smart storage (e.g., the SD card) for storing the instructions associated to the filtering model. The storage for storing the filtering model may include a mass storage (e.g., a magnetic disk, an optical disk, or a solid-state drives), a removable storage, (e.g., a flash drive, a floppy disk, an optical disk, a memory card, a zip disk, or a magnetic tape), a volatile read-and-write memory, a read-only memory (ROM), or the like, or any combination thereof. In some embodiments, the filtering model may be stored in a cloud server that may be communicated with the device or vehicle in real time. For example, the unwanted information may be filtered out by analyzing the movement data using the filtering model online. In some embodiments, the filtering model may be used to analyze any data related to driving behavior, vehicle status, or road status. For example, an automobile manufacturer may collect vehicle-related data by using the filtering model to delete the unwanted information. As another example, a traffic management department may use selected road-related information by using the filtering model to filter out the unwanted information. As still another example, an online on-demand service platform (e.g., an online carpooling service platform, or an online bicycle-sharing service platform) may record user-behavioral data for ranking users by using the filtering model to filter out the unwanted information.

In 530, the feature generation module 330 may generate feature data based on the filtered movement data. The filtered movement data may be movement data that may have been filtered out the unwanted information. The filtered movement data may include speed data, gyroscope data, acceleration sensor data, GPS data, gravity sensor data, light sensor data, temperature sensor data, fingerprint sensor data, heart rate sensor data, or proximity sensor data. In some embodiments, the filtered movement data may be raw data that may be directly generated by the one or more sensors (e.g., the acceleration sensor) in the device.

In some embodiments, the filtered movement data may be preprocessed in order to obtain feature data. The feature data may be used to train a machine learning trained model. In some embodiments, the feature data may include a vector, a determinant, a matrix, or the like, or any combination thereof. For example, the vector may include at least one item corresponding to different types of movement data. As another example, the vector with three items may be represented as (gyroscope data, GPS data, acceleration sensor data).

In some embodiments, the feature data may further include preprocessed data that is determined or generated based on the movement data. For example, the feature data may include a horizontal component of the acceleration sensor data, a vertical component of the acceleration sensor data, an average of speed data, an elevation data, or the like, or any combination thereof. As another example, the feature data may be a maximum value (the maximum value of the acceleration sensor data) or a minimum value of the movement data.

In some embodiments, the feature data may further include a relationship among two or more types of movement data. For example, the feature generation module 330 may determine the relationship between the acceleration sensor data and the speed data. As another example, the feature generation module 330 may determine the horizontal component of the acceleration sensor data based on the acceleration sensor, the horizontal component of the acceleration sensor data may be further used to determine the relationship between the horizontal component of the acceleration sensor data and the speed data, and the behavior analysis module 340 may preprocess the feature data based on the horizontal component of the acceleration sensor data, the speed data and the relationship. In some embodiments, the relationship may include an overall relationship of the movement data. For example, the feature data may include the acceleration sensor data, the speed data, and the gyroscope data, and the overall relationship of the acceleration sensor data, the speed data and the gyroscope data. The relationship may be represented as a number, a text, a category, a percentage, or the like, or any combination thereof. For example, the relationship between any two types of the movement data may be 0.1, 0.3, 0.7, 1, etc. In some embodiments, the feature generation module 330 may determine the feature data by using a function, or a formula.

In some embodiments, the feature generation module 330 may determine the feature data by selecting the movement data based on corresponding driving behavior. For example, if the machine learning trained model is determined for analyzing the aggressive acceleration, the feature generation module 330 may select the corresponding movement data, such as the horizontal component of the acceleration sensor data, the speed data, and a traffic light data, etc. As another example, if the machine learning trained model is trained for determine the aggressive turn, the feature generation module 330 may select the corresponding movement data, and the corresponding movement data may be used to generate the feature data including the maximum of the angular acceleration data, the lasting time of the angular acceleration, and the relationship between the angular acceleration data and the lasting time of the angular acceleration.

In some embodiments, the feature data may also be generated in the device that may connect with the remote server via the network 120. In some embodiments, if the vehicle with the device is driving in a route within the mountainous area unconnected with the network 120, the device may store the movement data for a while offline. When the route is completed, the device may be communicated with the network 120 and send the movement data. After receiving the movement data offline, the feature generation module 330 may generate the feature data for analyzing the driving behavior in 540.

In 540, the behavior analysis module 340 may analyze driving behavior based on the machine learning trained model and the feature data. The driving behavior may include an aggressive acceleration, an aggressive braking, an aggressive turn, or the like, or any combination thereof. In some embodiments, the behavior analysis module 340 may determine a behavior evaluation corresponding the driving behavior. The behavior evaluation may be used to assess the driving behavior or rank a level of service. For example, if the behavior evaluation of a first driver is higher than that of a second driver, the level of service of the first drive may be higher than that of the second driver.

In some embodiments, in 540, the terminal controlling module 350 may receive the alert data from the vehicle data recorder and send the instruction to the MIS terminal or the vehicle data recorder. The instruction may include whether to trigger the vehicle data recorder to generated a video, how to generate the video, who is main object in the video, whether to store the video, whether to submit the video, or the like, or any combination thereof. In some embodiments, the terminal controlling module 350 may send an instruction ignoring the alert data in order to forbid to generate the video. As another example, the terminal controlling module 350 may send an instruction acquiring an infrared video, and the vehicle data recorder may trigger the infrared camera to generate the infrared video. In some embodiments, the terminal controlling module 350 may send an instruction indicating that the passenger is the main object, and the vehicle data recorder may generate the video that may track the passenger. In some embodiments, the terminal controlling module 350 may send an instruction to ask the vehicle data recorder to submit the video in real time, and the vehicle data recorder may transmit data of the video to the remote server directly via the network 120.

Merely by way of example, the behavior evaluation may include statistic data, a driving score corresponding to each of the route, or times of danger behavior. The statistical data may include times of the aggressive acceleration, times of the aggressive braking, times of the aggressive turn, or the like, or any combination thereof. For example, the behavior analysis module determines that a driver who completed a route conducted 2 aggressive braking, 5 aggressive accelerations, and 3 aggressive turns. The driving score may be represented as a number, a percentage, a text, a level, or the like, or any combination thereof. For example, if the driver completes a section of a route safely following the driving rules of the route, the behavior analysis module 340 may determine the driving score as 9 out of 10, which may indicate an excellent for the driving behavior. As another example, the behavior analysis module 340 may determine the percentage as 95% that may means the driving behavior performance may exceed 95% drivers in a total number of the drivers. In some embodiments, the times of danger behavior may be used to remind the driver. The behavior analysis module 340 may determine the feature data to determine danger behaviors of the driver, and the behavior analysis module 340 may further count the times of danger behavior in real time or after a route completed. For example, the behavior analysis module 340 may recognize 17 times of the danger behaviors during the route. As another example, the behavior analysis module 340 may determine the danger behavior in a real time.

In some embodiments, the machine learning trained model may include a decision tree, an association rule model, an artificial neural networks, a deep learning model, an inductive logic programming model, a support vector machines model, a clustering model, a Bayesian networks, a reinforcement learning model, a representation learning model, a similarity and metric learning model, a sparse dictionary learning model, a genetic algorithms model, a rule-based machine learning model, or the like, or any combination thereof.

In some embodiments, the machine learning trained model may be trained offline in the remote server, and sent to an electronic device, a storage, or the like, or any combination thereof. The storage for storing the machine learning trained model may include a mass storage (e.g., a magnetic disk, an optical disk, or a solid-state drives), a removable storage, (e.g., a flash drive, a floppy disk, an optical disk, a memory card, a zip disk, or a magnetic tape), a volatile read-and-write memory, a read-only memory (ROM), or the like, or any combination thereof. In some embodiments, the machine learning trained model may be stored in a cloud server that may be communicated with the device or vehicle in real time. For example, the unwanted information may be filter out by analyzing the movement data using the machine learning trained model online.

In some embodiments, the machine learning trained model may be used to analyze any data related to driving behavior, vehicle status, or road status. For example, an automobile manufacturer may collect vehicle-related data by using the machine learning trained model to delete the unwanted information. As another example, a traffic management department may use select road-related information by using the machine learning trained model to filter out the unwanted information. As still another example, an online on-demand service platform (e.g., an online carpooling service platform, or an online bicycle-sharing service platform) may record user-behavioral data for ranking users by using the machine learning trained model to filter out the unwanted information.

In some embodiments, the machine learning trained model may be updated online or offline. After the machine learning trained model has been trained, the machine learning trained model may be further updated by using the movement data obtained in real time or in a periodical time interval (e.g., each day, or each week). In some embodiments, the machine learning trained model may be further updated into at least one of machine learning trained sub-model that may be corresponding to different types of the unwanted information. For example, a first sub-model may be used to distinguish the unwanted information associated with the vehicle, and a second sub-model may be used to distinguish the unwanted information associated with the mobile smart phone.

In some embodiments, in 540, the behavior analysis module 340 may further generate a vehicle status associated with the driving behavior. In some embodiments, the vehicle status may include a tire puncture, a line fault, an engine failure, an empty tank, a sudden absence of electrical power, a brake failure, or the like, or any combination thereof. The behavior analysis module 340 may analyze the feature data based on the machine learning trained model, and generate the vehicle status that may be used to estimate status of the vehicle. For example, the behavior analysis module 340 may determine the brake failure based on the feature data (e.g., a long-term acceleration data). As another example, the behavior analysis module 340 may determine the tire puncture in the route, and the tire puncture in the route may indicate a vehicle examine.

In some embodiments, in 540, the behavior analysis module 340 may further generate a road condition associated with the driving behavior. The road condition may include a sudden red traffic light, a traffic jam, a rushing out of a person, a sudden road accident, a bumpy road, a winding road, or the like, or any combination thereof. In some embodiments, the behavior analysis module 340 may determine the road condition based on the machine learning trained model and the feature data, and the road condition may be sent to a traffic management department. The traffic management department may use the road condition to regulate the traffic (e.g., adjust a time of traffic light, or restrict a number of the vehicles passing through a road).

In some embodiments, in 540, the behavior analysis module 340 may determine the driving behavior by using a confidence coefficient. The confidence coefficient may be used to determine whether the driving behavior is a dangerous behavior. For example, if an output of the machine learning trained model is larger than the confidence coefficient, the corresponding driving behavior may be determined as the dangerous behavior. If the output of the machine learning trained model is less than the confidence coefficient, the corresponding driving behavior may be determined as a safe behavior. As another example, the output of the machine learning trained model may be a probability, and the confidence coefficient may be set as a value (e.g., 0.6, 0.7, 0.8, 0.9, etc.). If the probability is 0.85, which is larger than the confidence coefficient (e.g., 0.8), the driving behavior corresponding to the input of machine learning trained model may be determined as the danger behavior. In some embodiments, user (e.g., a driver) may adjust the confidence coefficient from 0.8 to 0.6 in order to detect the dangerous behavior more sensitively, and the driving behavior may be more likely to be determined as the dangerous behavior.

In some embodiments, the process 500 may be stored as a set of instructions in a non-transitory computer readable medium embodying a computer program product. The non-transitory computer readable medium may communicate with a computer device and/or a user terminal (e.g., the device). When the instructions associated with the process 500 is executed, the computing device may obtain the movement data, filter out unwanted information based on a machine learning trained model, generate feature data based on the filtered movement data, and analyze driving behavior based on the machine learning trained mode and the feature data. More detail about the process 500 may be found in the description of FIG. 5.

Figure 6:
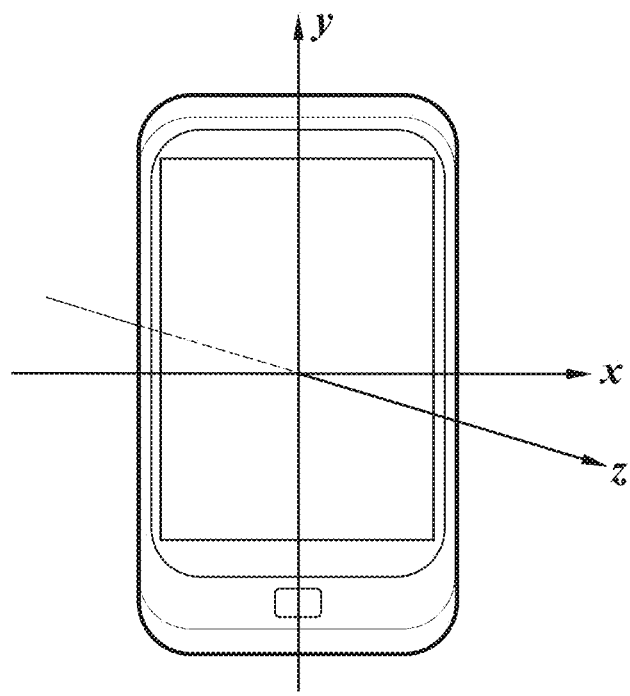
FIG. 6 is an exemplary diagram of a device according to some embodiments of the present disclosure.

FIG. 6 illustrates an exemplary diagram of a device according to some embodiments of the present disclosure. In some embodiments, the device may be a mobile smart phone. The mobile smart phone may include at least one of a camera, an accelerator sensor, a gyroscope sensor, a proximity sensor, an ambient light sensor, a touch sensor, a magnetometer sensor, a microphone, or a GPS. The ambient light sensor may detect luminous intensity around the mobile smart phone. For example, the mobile smart phone may detect the luminous intensity as 50 lux that may indicate the mobile smart phone may be in a dark environment. In some embodiments, movement data generated from the mart phone may be represented in a mobile smart phone coordinate system. As shown in FIG. 6, the mobile smart phone coordinate system may include an X coordinate axis, a Y coordinate axis, and a Z coordinate axis. The X coordinate axis, the Y coordinate axis, and the Z coordinate axis may be orthogonal with each other. The X coordinate axis may be defined parallel to a screen of the mobile smart phone from left to right. The Y coordinate axis may be defined parallel to the screen of the mobile smart phone from top to bottom. The Z coordinate axis may be perpendicular to the screen of the mobile smart phone. The mobile smart phone coordinate system may be fixed, and position or orientation of the mobile smart phone may not change the mobile smart phone coordinate system. The movement data generated from the mobile smart phone may be decomposed in the mobile smart phone coordinate system. For example, the accelerator sensor data may be decomposed according to the X coordinate axis, the Y coordinate axis, and the Z coordinate axis, the accelerator sensor data may be represented as $(A_x, A_y, A_z)$, wherein the Ax represents component of accelerator sensor data in the X coordinate axis, the Ay represents component of accelerator sensor data in the Y coordinate axis, and the Az represents component of accelerator sensor data in the Z coordinate axis. As another example, the gyroscope sensor data may be composed according to the mobile smart phone coordinate system and may be represented as (3, 5, 2), wherein 3 represents component of gyroscope sensor data in the X coordinate axis, 5 represents component of gyroscope sensor data in the Y coordinate axis, and 2 represents component of gyroscope sensor data in the Z coordinate axis.

In some embodiments, the movement data represented in the mobile smart phone coordinate system may be transformed, and represented in an earth coordinate system. The earth coordinate system may be referred to as FIG. 7. In some embodiments, the movement data may be transformed based on a transformation relationship between the mobile smart phone coordinate system and the earth coordinate system. The transformation relationship may be a transformation matrix that may be used to modify the movement data from the mobile smart phone coordinate system to the earth coordinate system. For example, the transformation matrix may be represented as $$\begin{bmatrix} T11 & T12 & T13 \\ T21 & T22 & T33 \\ T31 & T32 & T33 \end{bmatrix},$$

and the accelerator sensor data in the mobile smart phone coordinate system, (Ax, Ay, Az) may be transformed by multiplying the transformation matrix, $$\begin{bmatrix} T11 & T12 & T13 \\ T21 & T22 & T33 \\ T31 & T32 & T33 \end{bmatrix}$$

to obtain the accelerator sensor data in the earth coordinate system, (Ax', Ay', Az'). In some embodiments, the transformation relationship may be a transformation determinant with one row and three columns. For example, if the transformation determinant is |Tx, Ty, Tz|, the gyroscope sensor data in the mobile smart phone coordinate system, (Gx, Gy, Gz) may be modified by adding each item of transformation determinant respectively, and the accelerator sensor data in the earth coordinate system may be represented into (Gx+Tx, Gy+Ty, Gz+Tz).

In some embodiments, the transformation relationship may be adjusted when the mobile smart phone is moved. For example, if the mobile smart phone is moved by a driver, the transformation relationship may be updated based on the new location of the mobile smart phone or the new position of the mart phone. As another example, if the mobile smart phone is turned over by the driver, the transformation determinant, |Tx=2, Ty=5, Tz=9| may be adjusted to |Tx=2, Ty=5, Tz=−9|. As still another example, if the driver is using the mobile smart phone continuously, the mobile smart phone may record a moving track of the mobile smart phone, and the transformation relationship may be corrected based on the moving track of the mobile smart phone.

Figure 7:
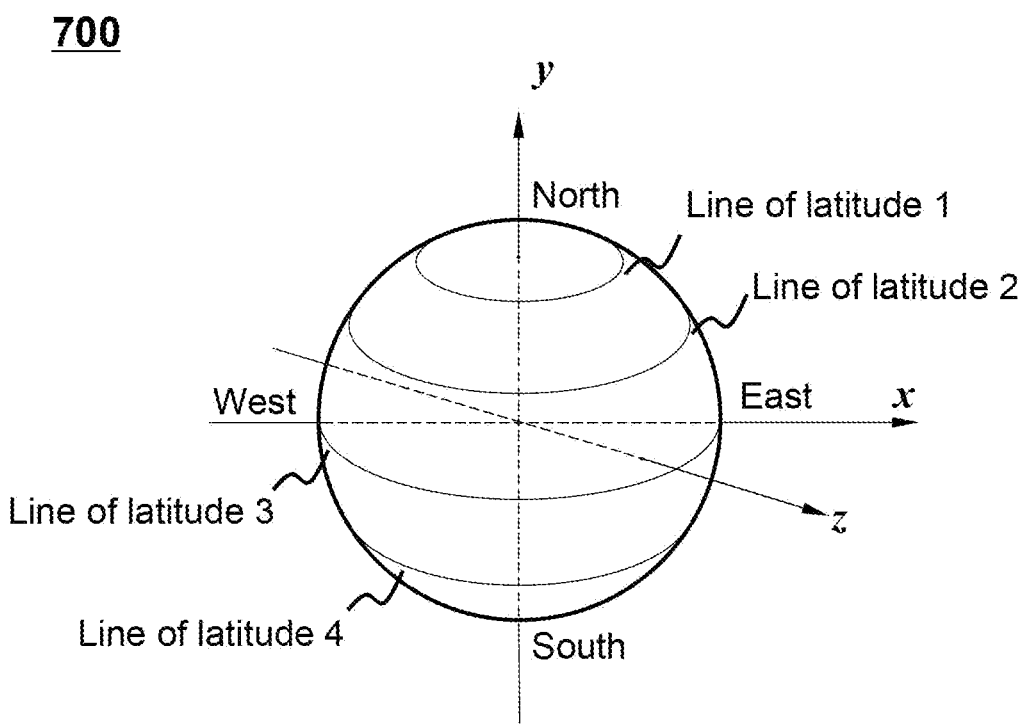
FIG. 7 illustrates an exemplary diagram of a coordinate system that rotates together with the earth according to some embodiments of the present disclosure.

FIG. 7 illustrates an exemplary diagram of a coordinate system that rotates together with the earth according to some embodiments of the present disclosure. In some embodiments, the earth coordinate system may include an X axis, a Y axis, and a Z axis. The X axis, the Y axis, and the Z axis may be orthogonal with each other. The X axis may be parallel to a horizontal plane from west to east. The Y axis may be parallel to the horizontal plane from south to north. The Z axis may be perpendicular to the horizontal plane. In some embodiments, the earth coordinate system may be adjusted by a user. In some embodiments, the earth coordinate system may be determined or corrected by a GPS or the Beidou Navigation System. In some embodiments, the movement data or the feature data may be presented in the earth coordinate system. Merely by way of example, the speed data in the device may be transformed and presented in the earth coordinate system as (120, 10, 0) m/s.

FIG. 8 is a schematic diagram illustrating exemplary hardware and software components of a computing device 800 on which the server 110, the service requestor terminal 130, and/or the service provider terminal 140 may be implemented according to some embodiments of the present disclosure. For example, the processing engine 112 may be implemented on the computing device 800 and configured to perform functions of the processing engine 112 disclosed in this disclosure.

The computing device 800 may be a computer, both may be used to implement an on-demand system for the present disclosure. The computing device 800 may be used to implement any component of the on-demand service as described herein. For example, the processing engine 112 may be implemented on the computing device 800, via its hardware, software program, firmware, or any combination thereof. Although only one such computer is shown, for convenience, the computer functions relating to the on-demand service as described herein may be implemented in a distributed fashion on a number of similar platforms, to distribute the processing load.

The computing device 800, for example, may include COM ports 850 connected to and from a network connected thereto to facilitate data communications. The computing device 800 may also include a central processing unit (CPU) 820, in the form of one or more processors, for executing program instructions. The exemplary computer platform may include an internal communication bus 810, program storage and data storage of different forms, for example, a disk 870, and a read only memory (ROM) 830, or a random access memory (RAM) 840, for various data files to be processed and/or transmitted by the computer. The exemplary computer platform may also include program instructions stored in the ROM 830, RAM 840, and/or other type of non-transitory storage medium to be executed by the CPU 820. The processes of the present disclosure may be implemented as the program instructions. The computing device 800 also includes an I/O component 860, supporting input/output between the computer and other components therein such as user interface elements 880. The computing device 800 may also receive programming and data via network communications.

The computing device 800 may include one or more interface circuits to transmit electronic signals between different components in the computing device 800, or between the computing device 800 and other electronic devices. For example, the interface circuits may receive electronic signals from the service requestor terminal 130 and/or the service provider terminal 140 and send the electronic signals to the bus 810, the CPU 820, ROM 830, or the RAM 840. The CPU 820 may include one or more processing circuits or logic circuits to process the electronic signals received form the other components of the computing device 800 or other electronic devices through the interface circuits. For example, the computing device 800 may process a task through operation of the processing circuits or the logic circuits in the CPU 820, and receive an instruction via electronic signals through the interface circuits.

Merely for illustration, only one CPU and/or processor is described in the computing device 800. However, it should be noted that the computing device 800 in the present disclosure may also include multiple CPUs and/or processors, thus operations and/or process steps that are performed by one CPU and/or processor as described in the present disclosure may also be jointly or separately performed by the multiple CPUs and/or processors. For example, if in the present disclosure the CPU and/or processor of the computing device 800 executes both step A and step B, it should be understood that step A and step B may also be performed by two different CPUs and/or processors jointly or separately in the computing device 800 (e.g., the first processor executes step A and the second processor executes step B, or the first and second processors jointly execute steps A and B).

FIG. 9 is a schematic diagram illustrating exemplary hardware and/or software components of an exemplary mobile device 900 on which a use terminal may be implemented according to some embodiments of the present disclosure. As illustrated in FIG. 9, the mobile device 900 may include a communication platform 910, a display 920, a graphic processing unit (GPU) 930, a central processing unit (CPU) 940, an I/O 950, a memory 960, and a storage 990. In some embodiments, any other suitable component, including but not limited to a system bus or a controller (not shown), may also be included in the mobile device 900. In some embodiments, a mobile operating system 970 (e.g., iOS™, Android™, Windows Phone™, etc.) and one or more applications 980 may be loaded into the memory 960 from the storage 990 in order to be executed by the CPU 1940. The applications 980 may include a browser or any other suitable mobile apps for receiving and rendering information relating to image processing or other information from the processing engine 112. User interactions with the information stream may be achieved via the I/O 950 and provided to the processing engine 112 and/or other components of the online on-demand service system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the users computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. An electronic device, comprising:
   at least one sensor;
   at least one processor-readable storage medium, including a set of instructions for detecting predefined driving behaviors; and
   at least one processor in communication with the at least one processor-readable storage medium, wherein when executing the set of instructions, the at least one processor is directed to:
   obtain first electronic signals encoding movement data associated with the electronic device from the at least one sensor at a target time point, wherein the first electronic signals encoding movement data is associated with a user behavior and the user behavior includes at least one of a sound-related behavior, a facial expression, a motion behavior, a dressing-up behavior, a ceremonial behavior;
   operate logic circuits in the at least one processor to filter out unwanted information from the first electronic signals encoding movement data based on a first machine learning trained model;
   operate the logic circuits to determine whether the first electronic signals encoding movement data meets a precondition based on a second machine learning trained model, the precondition including a frequency of a keyword or a facial expression mode;

upon the first electronic signals encoding movement data meeting the precondition, send second electronic signals encoding movement data within a predetermined time period associated with the target time point by a varying transmitting frequency; and send the second electronic signals encoding movement data within the predetermined time period associated with the target time point to a remote server.

2. The electronic device of claim 1, wherein the at least one sensor includes at least one of a gyroscope, an acceleration sensor, a global position system (GPS), or a gravity sensor.

3. The electronic device of claim 1, wherein the at least one processor is further directed to:

determine that the electronic device is moving with a vehicle.

4. The electronic device of claim 1, wherein the first electronic signals encoding movement data includes at least one of linear acceleration, angular acceleration, or gesture information, the gesture information including role information, yaw information, or pitch information.

5. The electronic device of claim 1, wherein the at least one sensor periodically generates the first electronic signals encoding movement data, and the at least one processor periodically obtain the first electronic signals encoding movement data.

6. The electronic device of claim 1, wherein the unwanted information is noise information associated with at least one of shaking the electronic device, dropping the electronic device onto a bottom of a vehicle, or an electronic malfunction of the electronic device.

7. The electronic device of claim 1, wherein the precondition includes at least one of a threshold of a linear acceleration, a threshold of a lasting time of the linear acceleration, a threshold of an angular acceleration, a threshold of a lasting time of the angular acceleration, a number of changes of an acceleration direction during a predetermined length of time, or a number of changes of a gesture with a time length.

8. The electronic device of claim 1, wherein to said send the second electronic signals encoding movement data within the predetermined time period associated with the target time point to the remote server, the at least one processor is further directed to:

determine a trigger time point once the first electronic signals encoding movement data meets the precondition; and select the second electronic signals encoding movement data in the predetermined time period based on the trigger time point.

9. A method for detecting predefined driving behaviors, comprising:

obtaining, by an electronic device, first electronic signals encoding movement data associated with the electronic device at a target time point, wherein the first electronic signals encoding movement data is associated with a user behavior and the user behavior includes at least one of a sound-related behavior, a facial expression, a motion behavior, a dressing-up behavior, a ceremonial behavior;

filtering out unwanted information from the first electronic signals encoding movement data based on a first machine learning trained model;

determining, by the electronic device, whether the first electronic signals encoding movement data meets a precondition based on a second machine learning trained model, the precondition including a frequency of a keyword or a facial expression mode;

upon the first electronic signals encoding movement data meeting the precondition, sending, by the electronic device, second electronic signals encoding movement data within a predetermined time period associated with the target time point by a varying transmitting frequency; and sending, by the electronic device, the second electronic signals encoding movement data within the predetermined time period associated with the target time point to a remote server.

10. The method of claim 9, further comprising:

determining that the electronic device is moving with a vehicle.

11. The method of claim 9, wherein the first electronic signals encoding movement data includes at least one of linear acceleration, angular acceleration, or gesture information, the gesture information including role information, yaw information, or pitch information.

12. The method of claim 9, wherein the electronic device periodically obtain the first electronic signals encoding movement data.

13. The method of claim 9, wherein the unwanted information is noise information associated with at least one of shaking the electronic device, dropping the electronic device onto a bottom of a vehicle, or an electronic malfunction of the electronic device.

14. The method of claim 9, wherein the precondition includes at least one of a threshold of a linear acceleration, a threshold of a lasting time of the linear acceleration, a threshold of an angular acceleration, a threshold of a lasting time of the angular acceleration, a number of changes of an acceleration direction during a predetermined length of time, or a number of changes of a gesture with a time length.

15. The method of claim 9, wherein the sending by the electronic device of the second electronic signals encoding movement data within the predetermined time period associated with the target time point to the remote server includes:

determining, by the electronic device, a trigger time point once the first electronic signals encoding movement data meets the precondition; and selecting, by the electronic device, the second electronic signals encoding movement data in the predetermined time period based on the trigger time point.

16. A non-transitory computer readable medium comprising instructions configured to cause an electronic device to:

obtain first electronic signals encoding movement data associated with the electronic device from at least one sensor at a target time point, wherein the first electronic signals encoding movement data is associated with a user behavior and the user behavior includes at least one of a sound-related behavior, a facial expression, a motion behavior, a dressing-up behavior, a ceremonial behavior;

operate logic circuits in at least one processor to filter out unwanted information from the first electronic signals encoding movement data based on a first machine learning trained model;

operate the logic circuits to determine whether the first electronic signals encoding movement data meets a precondition based on a second machine learning trained model, the precondition including a frequency of a keyword or a facial expression mode;

upon the first electronic signals encoding movement data meeting the precondition, sending, by the electronic device, second electronic signals encoding movement data within a predetermined time period associated with the target time point by a varying transmitting frequency; and send the second electronic signals encoding movement data within the predetermined time period associated with the target time point to a remote server.

* * * * *